(12) United States Patent
Minervini et al.

(10) Patent No.: US 7,647,940 B2
(45) Date of Patent: Jan. 19, 2010

(54) DEVICE AND METHOD FOR PNEUMATIC VALVE CONTROL

(75) Inventors: Leo Minervini, Saddle Brook, NJ (US); Eric Jordan, River Edge, NJ (US)

(73) Assignee: Westlock Control Corporation, Saddle Brook, NJ (US)

( * ) Notice: Subject to any disclaimer, the term of this patent is extended or adjusted under 35 U.S.C. 154(b) by 275 days.

(21) Appl. No.: 11/435,976

(22) Filed: May 17, 2006

(65) Prior Publication Data

US 2006/0272710 A1 Dec. 7, 2006

Related U.S. Application Data

(63) Continuation-in-part of application No. PCT/US2005/011566, filed on Apr. 5, 2005.

(51) Int. Cl.
*F15B 13/043* (2006.01)

(52) U.S. Cl. .............................. 137/454.6; 137/625.66; 137/487.5; 137/488; 137/625.64; 137/454.2

(58) Field of Classification Search ............. 137/625.64, 137/625.66, 487.5, 488, 454.2, 454.6
See application file for complete search history.

(56) References Cited

U.S. PATENT DOCUMENTS

| | | | | | |
|---|---|---|---|---|---|
| 2,964,018 | A | * | 12/1960 | Farron | 137/625.61 |
| 3,176,593 | A | * | 4/1965 | Bernstein | 91/459 |
| 3,227,180 | A | * | 1/1966 | Tissot-Dupont | 137/625.66 |
| 3,513,876 | A | | 5/1970 | Tarbox | |
| 4,646,785 | A | * | 3/1987 | Ruedle et al. | 137/625.64 |
| 5,086,803 | A | * | 2/1992 | Nakajima | 137/270 |
| 5,240,042 | A | * | 8/1993 | Raymond | 137/625.66 |
| 5,806,565 | A | * | 9/1998 | Kadlicko | 137/625.63 |
| 6,520,202 | B2 | * | 2/2003 | Miyazoe et al. | 137/554 |
| 6,675,830 | B2 | * | 1/2004 | Doi et al. | 137/552 |
| 2003/0075220 | A1 | | 4/2003 | Doi et al. | |
| 2005/0139274 | A1 | * | 6/2005 | Patel | 137/625.64 |

FOREIGN PATENT DOCUMENTS

WO 2005097792 A1 10/2005

* cited by examiner

*Primary Examiner*—Stephen Hepperle
*Assistant Examiner*—William McCalister
(74) *Attorney, Agent, or Firm*—Daniel N Daisak; Wyatt B. Pratt

(57) ABSTRACT

An apparatus for controlling a valve including an enclosure that defines first and second chambers, an indicator proximate the first and second chambers, an operating media distribution system that is disposed in the first chamber, and an electronic control unit disposed in the second chamber. The operating media distribution system includes a manifold block that has an exterior surface, and a plurality of operating media distribution cartridges exchangeably disposed with respect to the manifold block. The manifold block defines a plurality of holes, an operating media supply passage and an operating media exhaust passage. Each of the plurality of operating media distribution cartridges is disposed in a respective one of the plurality of holes and includes a cylinder and a spool assembly that is disposed in and displaced relative to the cylinder. The electronic control unit operates at least one electromagnetic valve to control operating media flow via the operating media distribution system.

57 Claims, 33 Drawing Sheets

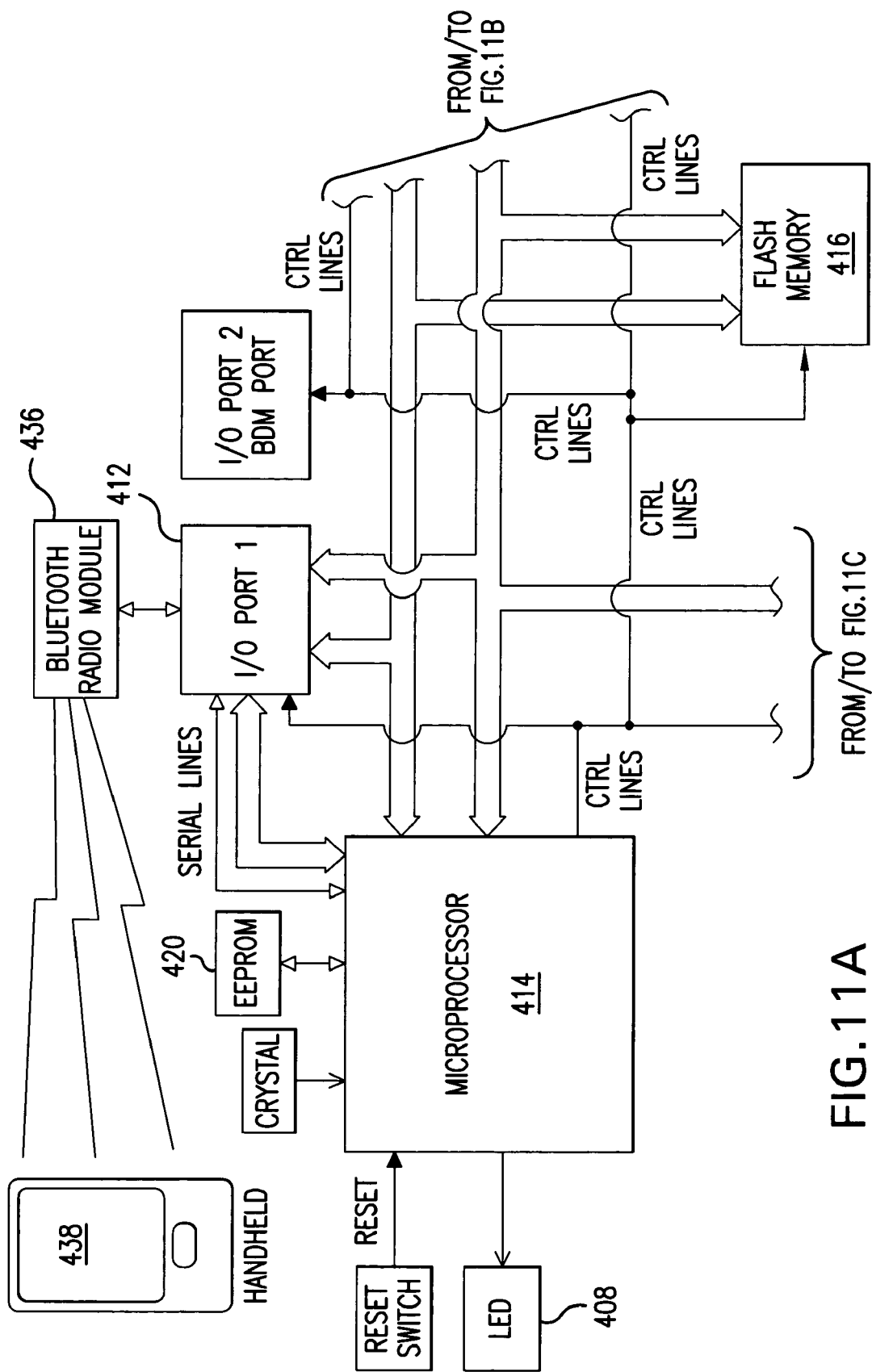

PROCESS VALVES IN ZERO POSITION
VALVE A DE-ENERGIZED, VALVE B DE-ENERGIZED

PROCESS VALVE IN SPAN POSITION
VALVE A ENERGIZED, VALVE B ENERGIZED

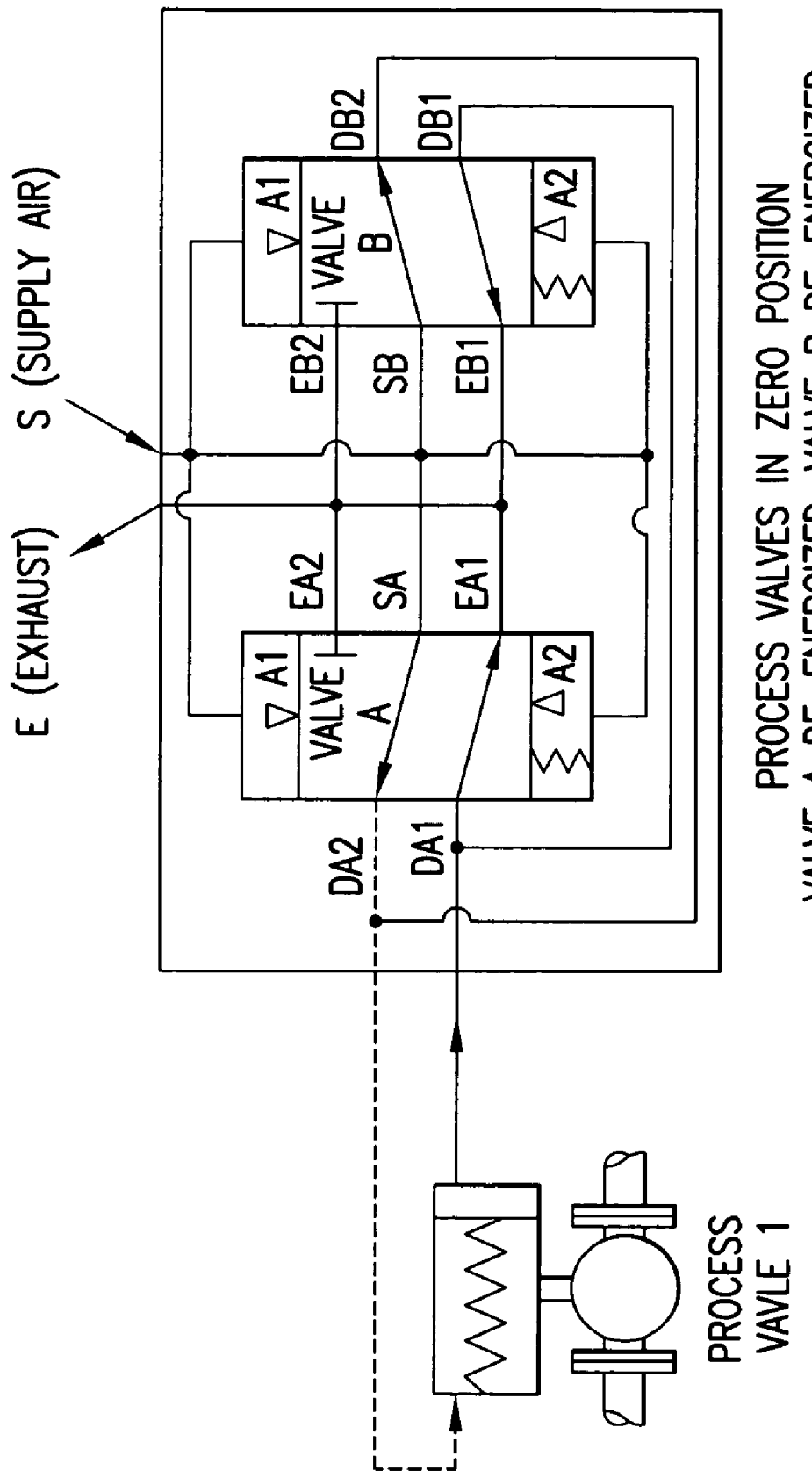

PROCESS VALVES IN SPAN POSITION
VALVE A ENERGIZED, VALVE B ENERGIZED

DEVICE AND METHOD FOR PNEUMATIC VALVE CONTROL

This patent application is a continuation-in-part of co-pending PCT Application No. PCT/US2005/11566, filed on Apr. 5, 2005 pursuant to 35 USC Section 363, which claims the benefit of U.S. Provisional Application Ser. No. 60/559, 002, filed Apr. 5, 2001. The aforementioned patent applications are all incorporated by reference herein in their entireties.

FIELD OF THE INVENTION

The present invention relates generally to a valve controller, and further to an actuator within an integrated valve controller. The present invention also relates to systems that include the valve controller and operational methods for monitoring the operational characteristics of a valve through knowledge-based valve performance criteria.

BACKGROUND OF THE INVENTION

Valve control systems are known in the related art. A valve control system may be used, for example, to continuously control the position of a valve based on pneumatic pressure. A valve control system may also have the capability to indicate valve position. A valve control system may further have the capability to monitor valve operation and signal an error message, if a failure condition occurs.

SUMMARY OF THE INVENTION

The present invention relates to a low profile multi-purpose pneumatic valve controller with integral coil and valve manifold. The valve controller may be used to control one process valve with increased air flow dynamics, provide redundant control for one process valve, or control two independent valves. The valve controller may be configured with integral pressure sensors to allow for advanced diagnostics that can be tailored to a particular valve and/or actuator. The valve controller may also be configured to automatically acquire and process data to create advanced diagnostic methods and systems.

The valve controller may have an enclosure that includes various features that can be utilized to achieve other functions in addition to simply house the valve controller. For example, the valve controller may have separate enclosures for mechanical and electronic components, and the separate enclosures may define chambers for all components to avoid exposure to operative conditions. The valve controller enclosure may be configured to integrate with an actuator, such that the integrated valve controller may have separate chambers for mechanical and electronic components. The integrated actuator and valve controller may have separate mechanical and electrical components to allow for a method of individual component maintenance and/or replacement. The valve controller may have a height profile of no more than 3 inches, and preferably less than 2.5 inches. The valve controller with a height profile of no more than 3 inches may be capable of providing two pneumatic control signals from a single pneumatic control supply, and may be provided with an integrated actuator.

The valve controller may have a beacon (position indicator) located between separate chambers for mechanical and electronic components. The size of the beacon (position indicator) may be selected to allow for viewing by an observer from a remote location. The beacon (position indicator) may operate via a non-contact position sensor. The valve controller with a beacon (position indicator) disposed adjacent operative components may be viewed from a site range both above and below the centerline of a position indicator. The position indicator may be a rotary or linear configuration. The valve controller and beacon (position indicator) may also be integrated with an actuator to provide an integrated actuator and valve controller, the valve controller having a beacon (position indicator) located between separate chambers for mechanical and electronic components. The integrated actuator and valve controller may be configured to provide the valve controller with a beacon (position indicator) disposed adjacent operative components so that it can be viewed by an observer from a site range both above and below the center line of a position indicator.

Design aspects of the valve controller package are unique. For example, the valve controller enclosure or package may have a housing with the enclosure being a bow-tie configuration.

The valve controller may have a manifold block having holes for one or two spool valve assembly cartridges. The manifold block may be a single, homogenous formation. Each spool valve assembly cartridge may be exchangeable, as a unit, with respect to the manifold block. The valve controller may have a housing with a single pneumatic supply path, separate transmission paths to process valve actuators, a single exhaust path, and an individual pressure sensor for each path. Two of the sensors can be differential pressure sensors.

The valve controller may provide for different operative arrangements. The valve controller may have a single pneumatic supply port that allows for two operational control signals. The two operational control signals may provide a first command signal and a second command signal to a single valve. The first command signal may be a discrete command signal. The second command signal may be a modulating command signal. The valve controller may be integrated with an actuator, the valve controller having a single pneumatic supply port that allows for two operational control signals. The valve controller may be used to operate a valve with two different command signals from a single pneumatic supply port. The valve controller may be used in a method of operating an integrated actuator with two different command signals from a single pneumatic supply port. The valve controller may have a single pneumatic supply port that allows for two operational control signals. The two operational control signals may provide a discrete command signal to a first valve and a separate discrete command signal to a second valve. The valve controller may be integrated with an actuator, the valve controller having a single pneumatic supply port that allows for two separate and identical operational control signals. The valve controller may be configured to provide a method of controlling fail-safe operation of two valves with a single supply.

The valve controller may have knowledge-based valve performance ("performance") attributes. The functionality of the microprocessor and methods for implementing performance attributes are developed by generic process flow charts that relate the evaluated pressures and the valve condition determined from the evaluated pressures. The valve controller with integral pressure sensors can be used to profile pressures of a single supply port and a single exhaust port so that diagnostics and fault monitoring can be accomplished with a microprocessor. Diagnostics for the performance attributes may include: (1) a "Factory Torque Profile", (2) a "Commissioned Torque Profile" and (3) a "Maintenance Torque Profile". Performance attribute fault monitoring may include: (1) "Insufficient Line Pressure to Guarantee Correct Operation", (2) "Supply Pressure Failure", (3) "Valve Shaft Bent", (4) "Valve Not Achieving Full Stroke", (5) "Backlash Detection", (6) "Torque Demand of Valve Approaching Actuator limit", (7) "Valve Seating/Break-Out Torque Monitoring", (8) "Torque Limit Exceeded", (9) "Close on Torque", (10) "Shaft Broken", (11) "Valve Exercise", (12) "Valve Packing Torque", (13) "Line Filter and Silencers Conditions", and (14) "Solenoid Spool Sticking".

Methods of valve diagnostics and fault monitoring provided by a valve controller with integrated pressure sensors are described. Each of the diagnostic capabilities of the valve controller has a separate method. For example, the "Commissioned Torque Profile" or "Maintenance Torque Profile" may be used to compare with a factory torque profile to detect any fouling of the valve disc or deformation of the valve seat. In another example, the "Insufficient Line Pressure to Guarantee Correct Operation" fault monitoring can be used to indicate that the air supply pressure to a valve may not be sufficient to guarantee either opening or closing. In another example, the "Supply Pressure Failure" fault monitoring may be used to indicate that supply line pressure has fallen bellow a required amount. In yet another example, "Valve Shaft Bent" fault monitoring may be used with a phase shift of torque profile to determine if a valve shaft is bent.

Remote communication with the valve controller can be provided via wire or wireless technology. Each of the features for protection with respect to the valve operative arrangements and knowledge based valve performance can be used with a industrial communication bus, for example, Foundation Fieldbus, Profibus etc; in conjunction with a short-range wireless protocol, and/or a communication method via the Internet. The combination of knowledge based valve performance with remote communications via the Internet provides various opportunities to implement maintenance and monitoring of valves at a location remote from the location of maintenance staff. For example, the valve controller can be used with a method of maintaining the operative performance of two valves, including evaluating the operative conditions of two valves with a single valve controller, communicating the operative conditions of the two valves to a remote location via an internet communication link, and changing operative commands of the valve controller via an internet communication link.

Sub-components of the valve controller may have preferred embodiments. For instance, features of the pneumatic manifold assembly/manifold may have a preferred embodiment. In one example, the manifold assembly may include a manifold with two coils and spools. In another example, the manifold assembly may have a single supply path, two pilot paths, and a single exhaust path. The manifold assembly may further be a monolithic member or a two-piece member. The two-piece member may include a base and a cover, the cover defining paths within the base. In another example, the manifold assembly may include a manifold with two coils, two spools, and sensors. In another example, the manifold assembly may a single supply path, two pilot paths, and single exhaust path that can be used as a stand alone valve controller island. In yet another example, the manifold assembly may be operatively associated with an electronic controller disposed on an enclosure, the manifold assembly having a single supply path, separate transmission paths, and single exhaust path. In another embodiment, the manifold assembly may be operatively associated with existing smart valve controllers. Moreover, features of the mechanical enclosure may be preferred. For example, in one embodiment the mechanical enclosure may include a pneumatic manifold assembly and a manifold block. In another embodiment, the mechanical enclosure may be packaged together with a separate electronic enclosure. In another embodiment, the mechanical enclosure may be used as a stand-alone valve controller island. Additionally, distinct features of the beacon (position indicator) housing and beacon (position indicator) may be preferred. For example in one embodiment, the beacon (position indicator) may have a housing that defines a viewing window for a position indicator and a mounting surface generally parallel to a longitudinal axis of the position sensor.

Systems that include the valve controller or utilize a feature on the valve controller are described. For example, the valve controller can be used in a system of piping including a first pipe, a second pipe proximate the first pipe, a valve disposed between the first pipe and the second pipe, a valve actuator that operates the valve, and a valve controller that operates the valve actuator, the valve controller including a housing having a single supply path that feeds two separate transmission paths, the two separate transmission paths having a common exhaust path. Further details of the system are described to specify various illustrative uses of the valve controller. For example, piping to the controller can be defined. Written materials specifying the valve controller and its use may also be described.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIGS. 11A, 11B and 11C are schematic diagrams illustrating an electrical circuit of the valve controller illustrated in FIG. 1B.

FIG. 14A is a schematic diagram illustrating a third preferred embodiment of a piping system with a valve controller, as shown in FIG. 1B, in an exemplary configuration for controlling one process valve. The valve actuator for the process valve is shown in a zeroed position.

DETAILED DESCRIPTION OF THE PREFERRED EMBODIMENTS

Figure 1A:
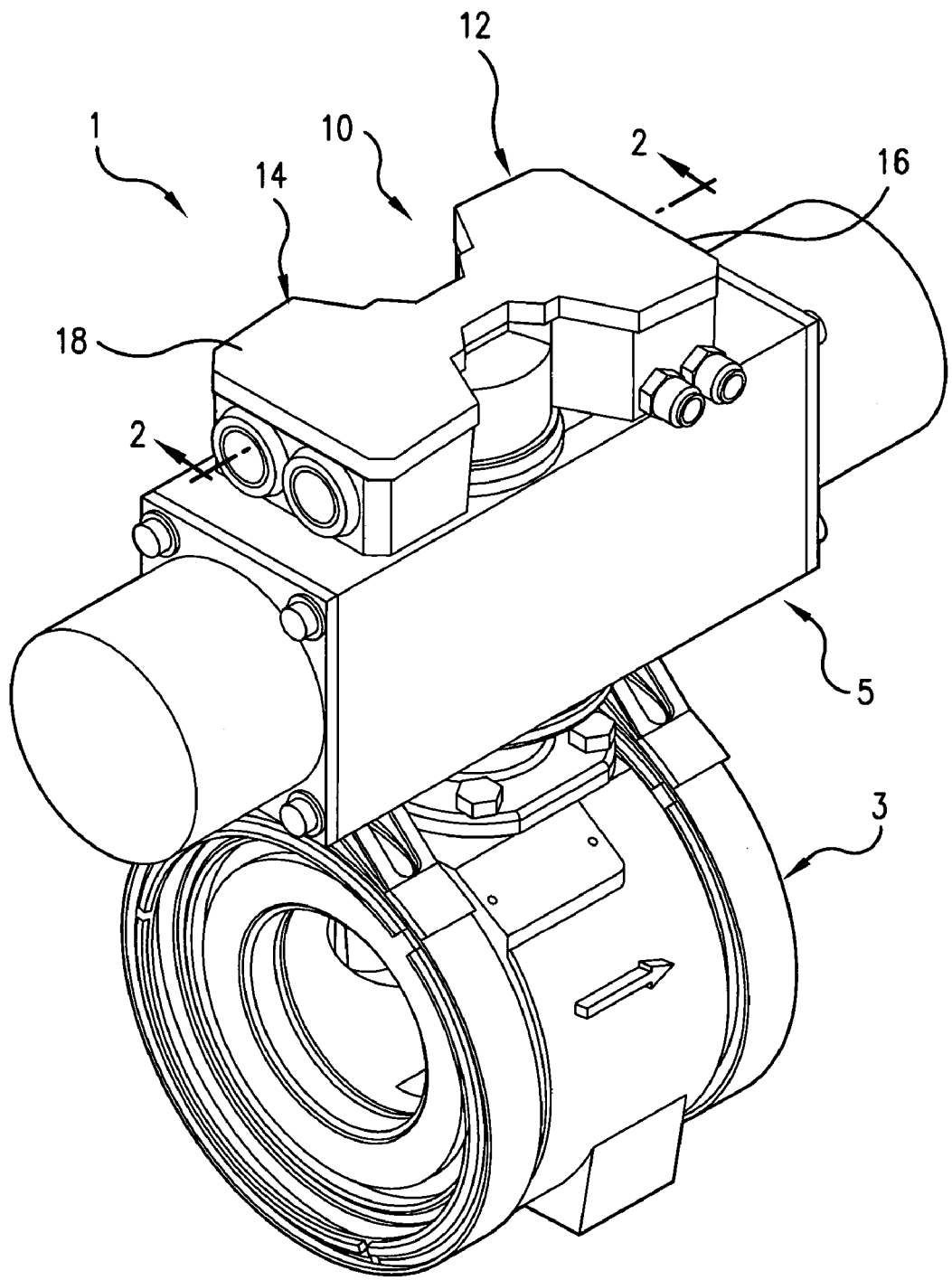
FIG. 1A is a perspective view of an exemplary embodiment of a piping system including a preferred embodiment of a pneumatic valve controller, the valve controller having separate chambers for mechanical and electrical components.
Figure 1B:
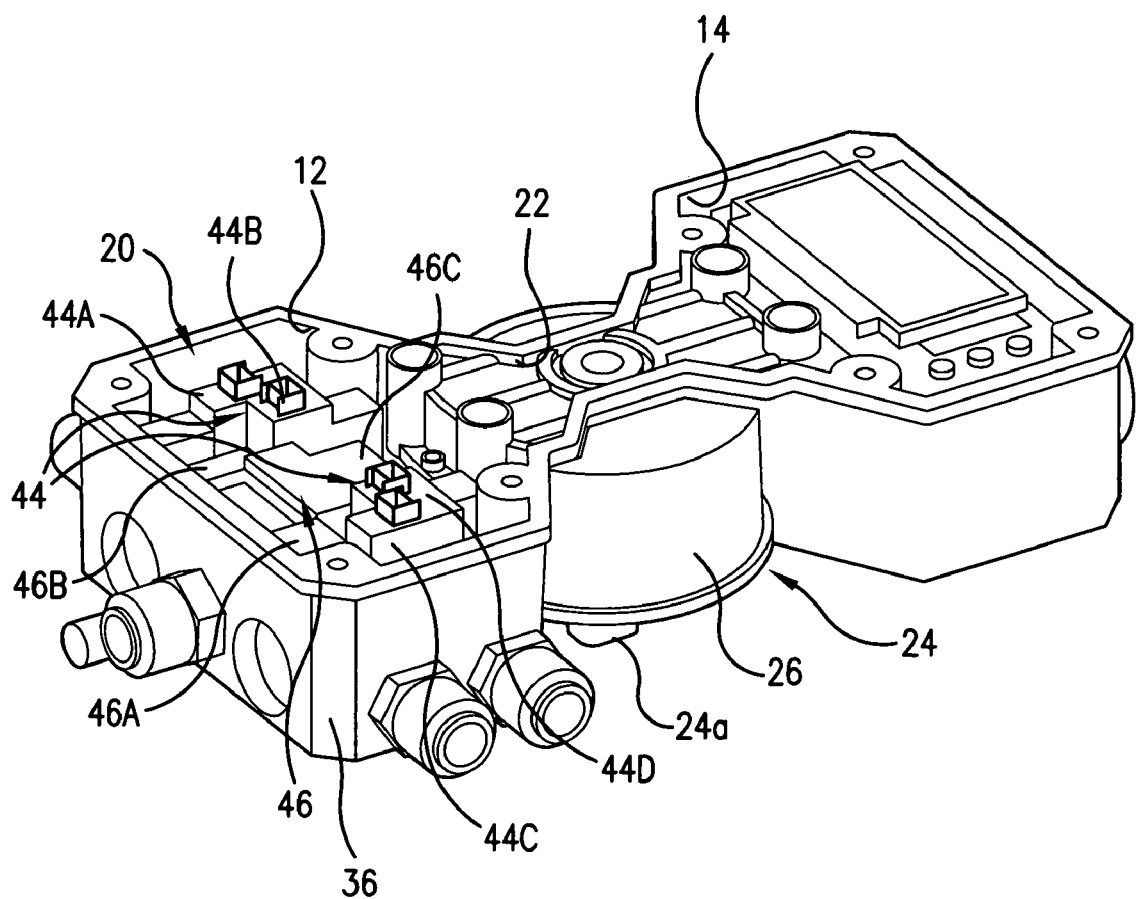
FIG. 1B is a perspective view, with the cover removed, of the valve controller illustrated in FIG. 1A.

FIG. 1A illustrates an exemplary embodiment of a piping system 1 including a process valve 3, an actuator 5 for the process valve 3, and a valve controller 10 with separate chambers 12,14 for mechanical and electronic components. Referring additionally to FIG. 1B, the chambers 12,14 define an enclosure 16 in which all components are housed to avoid exposure to operative conditions. Referring back to FIG. 1A, a releaseably securable enclosure cover 18, which may be independently removed, identically covers chambers 12,14.

The enclosure cover 18 allows for maintenance of the valve controller 10. Alternatively, a multiple piece cover could be used in place of the single enclosure cover 18 such that separate access to either of the mechanical or electrical chambers 12,14 is permitted for service.

As shown in FIG. 1B, the first chamber 12 may provide a housing for mechanical components such as a pneumatic manifold assembly 20 and a second chamber 14 may provide space to house electronic components such as circuit boards, a microprocessor, a display, and/or other circuits, as will be described further with respect to FIG. 10A. The chambers 12, 14 may have any shape and configuration as long as they enclose the components to avoid exposure to operative conditions. For instance, the separate chambers 12, 14 may abut or be situated adjacent to one another, and form a particular shape. For example, the valve controller 10 may have a polygonal shape with each chamber 12, 14 forming a portion of the polygonal shape. According to a preferred embodiment, the valve controller 10 may have a bow-tie shape.

The chambers 12, 14 for mechanical and electrical components may be separated by a third chamber 22 housing a valve position indicator 24. The third chamber 22 is preferably enclosed by the cover 18, but may alternatively have its own independent cover. The portion of the cover 18 enclosing the third chamber 22 may include the constricted portion of the bow tie configuration, and thus have tapered sides allowing the valve position indicator 24 to be directly visible from a site range above the centerline of the position indicator 24. The third chamber 22, however, may have any shape or configuration provided it allows the valve position indicator to be viewed from a position above the valve controller. Further, the three chambers 12,14,22, may have any configuration that provides direct visibility of the position indicator 24. For example, the valve controller 10 may have a suitable shape such as, for example, square, rectangular, oval-like or circular configuration such that the shape allows the valve position indicator 24 to be directly visible to an observer from a site range both above and below the center line of the position indicator 24. Similarly, any number of members may be used to cover the chambers provided that the members cooperate with the chambers to define at least one enclosure that protects all components from exposure to operative conditions. Thus, in one example, the cover 18 is preferably a unitary member. In another example, the cover may alternatively have two or more members.

The valve controller chambers 12, 14, 22 and cover 18 may be formed from any suitable metal, alloy, composite, or plastic material. For example, the enclosure cover 18 may be formed from a transparent plastic material. Similarly, as shown in FIG. 1A, one or more of the chambers 12, 14 and the enclosure cover 18 may be fashioned from opaque plastic materials. The valve controller chambers 12, 14, 22 and cover 18 may further be made from corrosion resistant materials such as polypropylene. The enclosure defined by the chambers and the cover may also be adapted for approved use in hazardous atmospheres.

Figure 2:
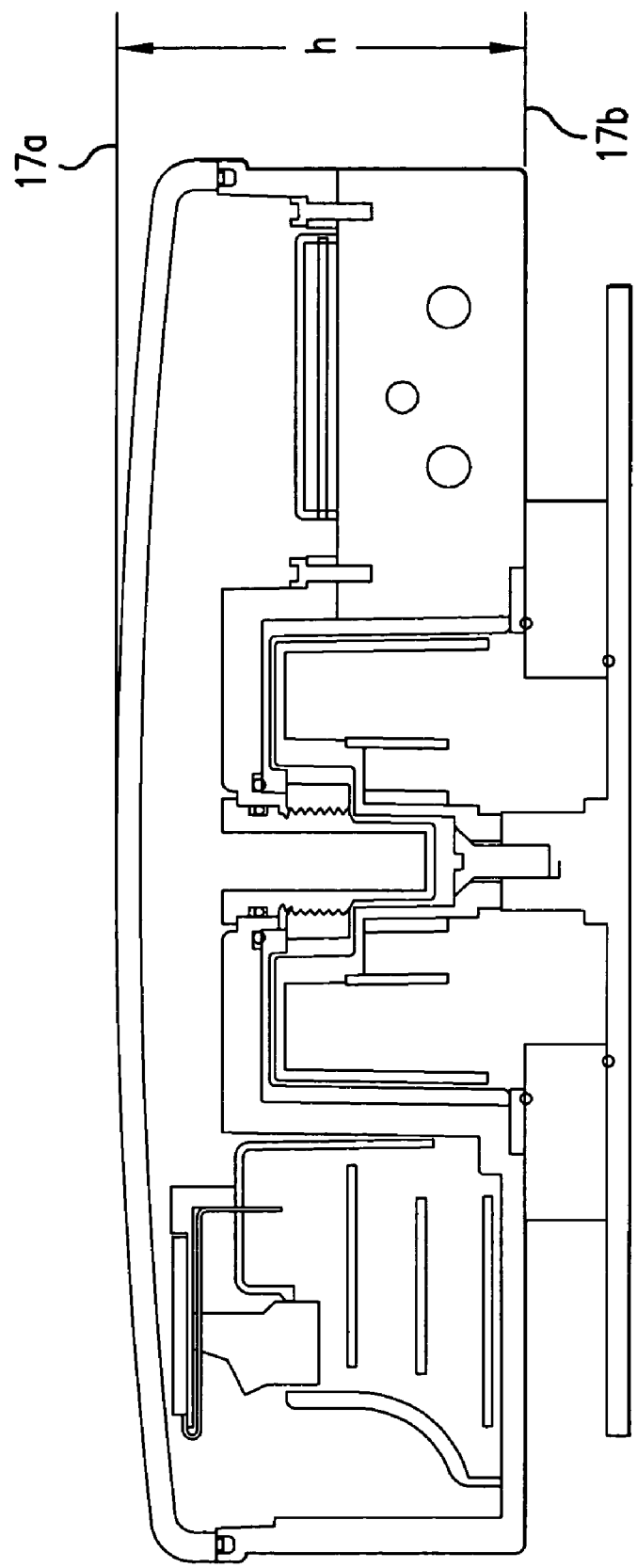
FIG. 2 is a view, taken along line 2-2 in FIG. 1A, showing in cross-section an enclosure for the pneumatic valve controller illustrated in FIG. 1B, and showing in elevation internal components of the pneumatic valve controller.

As shown in FIG. 2, the valve controller 10 of FIG. 1B has a height profile h that is measured from between parallel planes 17a,17b. According to a preferred embodiment, the top and bottom surfaces of the enclosure of valve controller 10 coincide with parallel planes 17a, 17b. Preferably, height profile h of the enclosure of valve controller 10 is no more than about three inches, and most preferably less than 2.5 inches.

Figure 9:
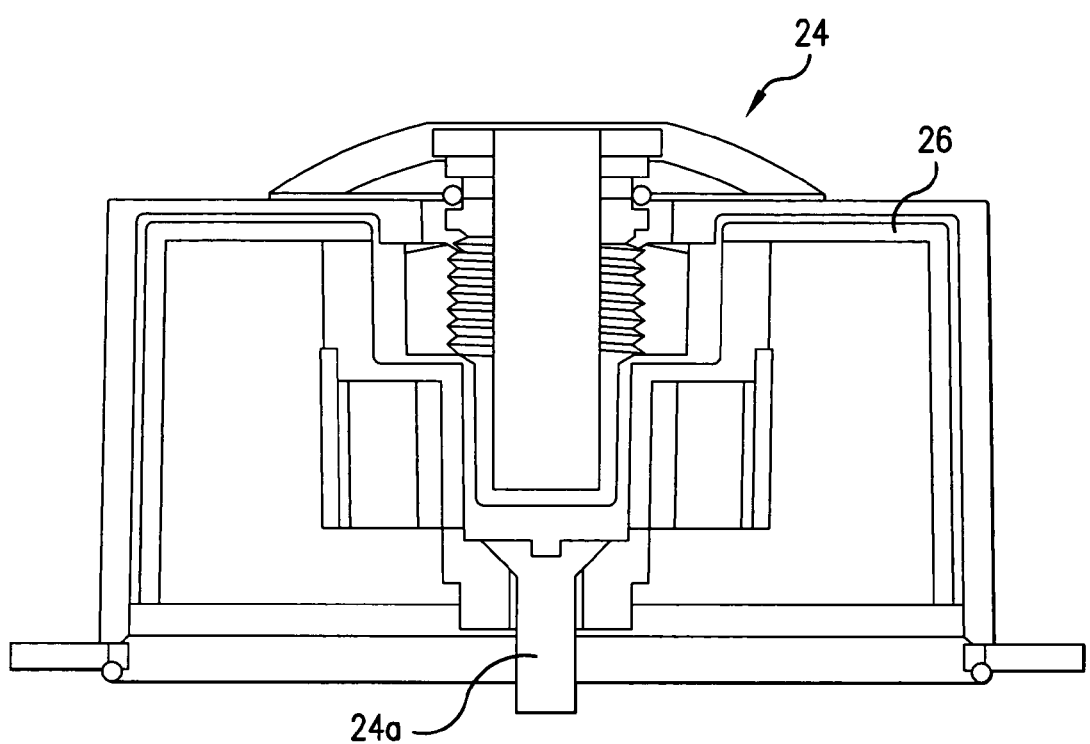
FIG. 9 is a cross-section view of the position indicator shown in FIG. 8.

Referring back to FIGS. 1A and 1B, the valve position indicator 24 may also have a beacon or position indicator 26 or visual signal for identifying the position or operating state of one or more process valves that are being controlled by the controller. For example, the beacon 26 may provide a distinct visual signal for a process valve operating under normal conditions in an open position, closed position, or an intermediate position between the open and span position. As described further below with respect to FIG. 9B, the valve position indicator 24 may also have a distinct visual beacon signal 26 for identifying the state of at least one, and preferably two, independent process valves that are being controlled by the controller. The valve position indicator 24 may be a rotary or linear, and may be located between separate chambers 12,14 for mechanical and electronic components. The size of the beacon 26 may be selected to allow for viewing from a remote location. The valve position indicator 24 may be disposed adjacent operative components so that beacon 26 can be viewed from a site range both above and below the centerline of the position indicator. The beacon 26 may operate, for example, via a non-contact position sensor (not shown) such that the valve controller 10 need not be integrally connected to a process valve actuator. Alternatively, the valve position indicator 24 may have a shaft 24a that is operatively coupled directly to the actuator for the process valve 3, so that movement of the actuator directly rotates the beacon 26 to indicate the position of the process valve 3.

Figure 3A:
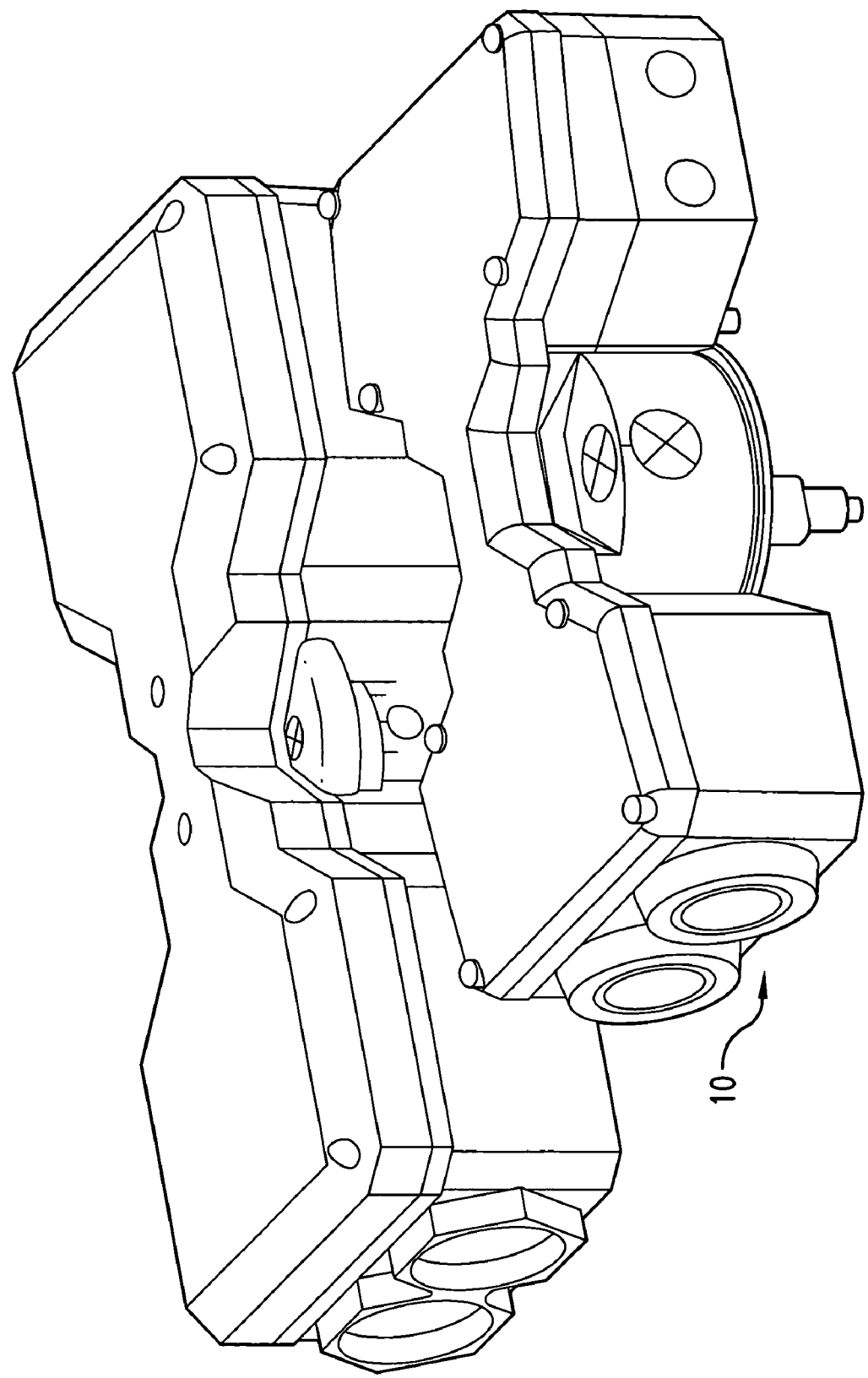
FIGS. 3A, 3B and 3C illustrate a relative comparison of the enclosure of the valve controller illustrated in FIG. 1B.
Figure 3B:
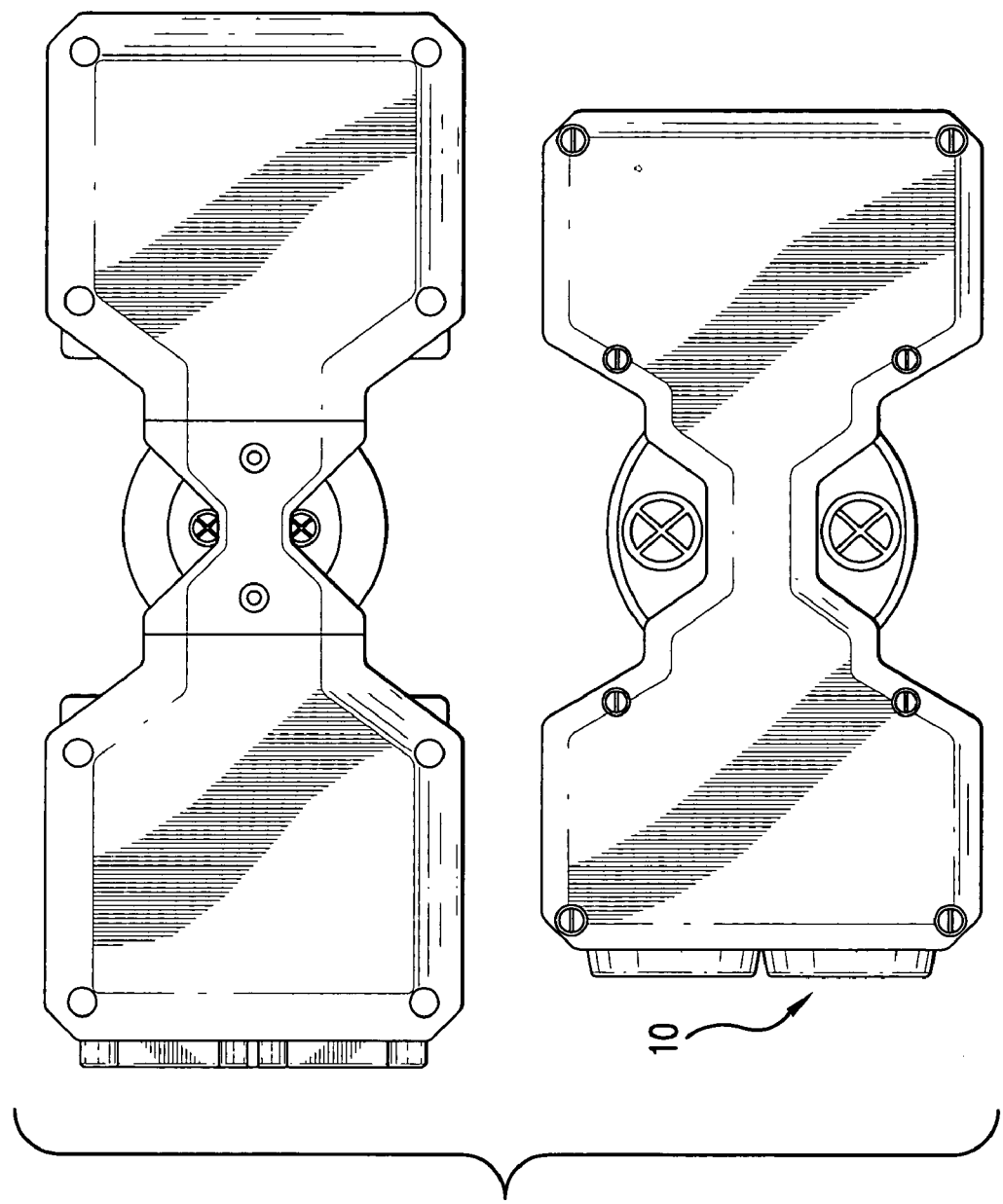
Figure 3C:
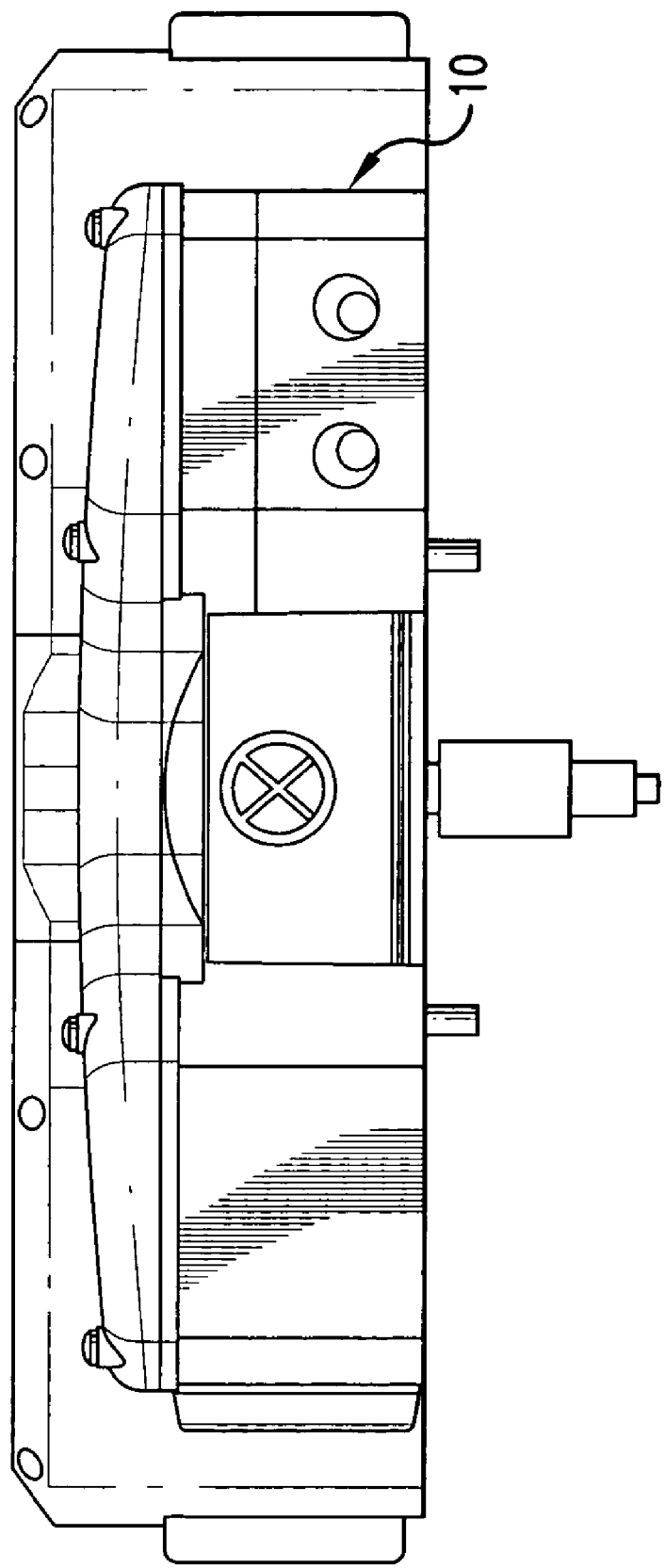

FIGS. 3A, 3B and 3C provide a comparison of the relative enclosure dimensions of the valve controller 10 with respect to another of Applicants' valve controllers described in international application no. PCT/US2005/011566, filed 5 Apr. 2005, now WO 2005/097792. In particular, the valve controller 10 is more compact, especially in the height and length dimensions. Additionally, the position indicator 24 or valve controller 10 is proportionately larger with respect to the chambers 12, 14, 22.

Figure 4A:
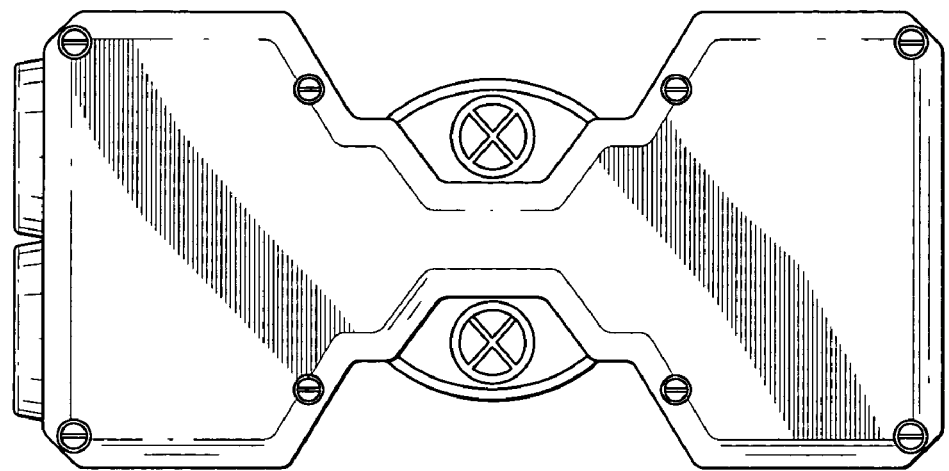
FIGS. 4A and 4B illustrate overall dimensions of a preferred embodiment of the valve controller illustrated in FIG. 1B.
Figure 4B:
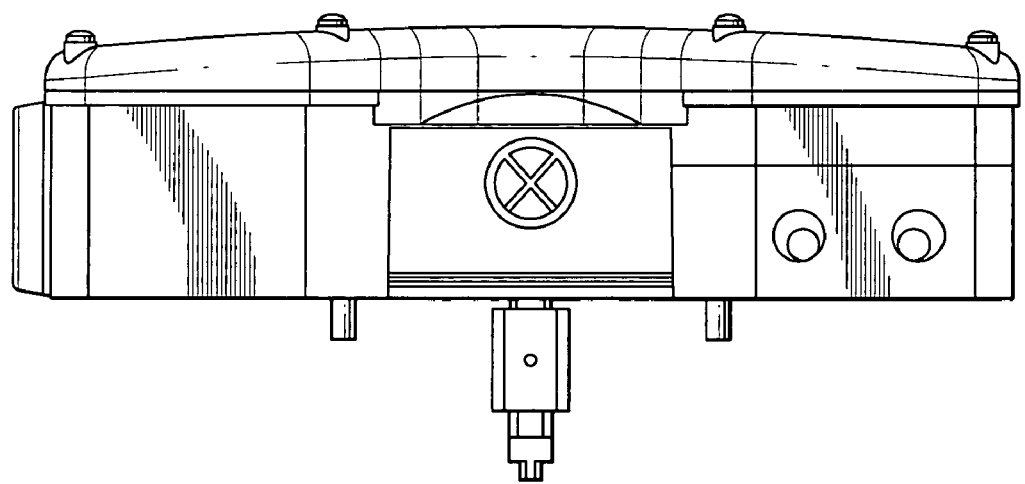

FIGS. 4A and 4B illustrate overall dimensions of a preferred embodiment of the valve controller 10. Preferably, the height of the chambers 12, 14, 22 and cover 18 is approximately 2.30 inches, the length is approximately 8.47 inches, the width is approximately 4.20 inches, and the diameter of the position indicator 24 is approximately 2.95 inches. Thus, as compared to Applicants' valve controller described in international application no. PCT/US2005/011566, filed 5 Apr. 2005, now WO 2005/097792, the height of valve controller 10 is approximately 0.44 inches less (approximately 16%), the length of valve controller 10 is approximately 1.78 inches less (approximately 17%), and the diameter of the position indicator 24 is approximately 1.31 inches greater (approximately 80%).

Referring additionally to FIGS. 5A-H, the pneumatic manifold assembly 20 of the valve controller 10 includes one manifold inlet air supply port 28, one manifold exhaust port 30, and four transmission ports 34 for process valve actuator operation. The ports 28,30,34 are adapted to connect to ¼ inch NPT, PG13 or the like conduit (not shown) with suitable conduit attachment members 34 that are secured within a manifold block 36 of the pneumatic manifold assembly 20.

The manifold block 36 is preferably formed as a monolithic member. As it is used herein, the term "monolithic" refers to a single, uniform whole member, preferably formed of a homogeneous material. Preferably, the manifold block 36 is cast, molded and/or machined as a monolithic unit of the same material. Alternatively, the manifold block 36 may be an assembly of a plurality of portions that are individually cast, molded and/or machined, and then joined by one or more fastening techniques including threaded fasteners, thermal bonding and/or adhesive bonding. Additionally, when a plurality of portions and one or more fastening techniques are assembled, the manifold block 36 may alternatively be a composite or combination of two or more different materials, e.g., metal threaded fasteners may be used to assembly a plurality of polymeric portions.

The manifold block 36 can be made of any suitable material, such as for example, metal, alloy, composite, and plastic materials. At ambient temperatures, the block material and internal cavity configuration should be capable of containing and transporting operating media, for example, non-lubricated air filtered to about 20 microns (or some other fluid), at temperatures between about −40 degrees Fahrenheit to 180 degrees Fahrenheit and at pressures of between about 45 to 120 pounds per square inch gauge.

Figure 5A:
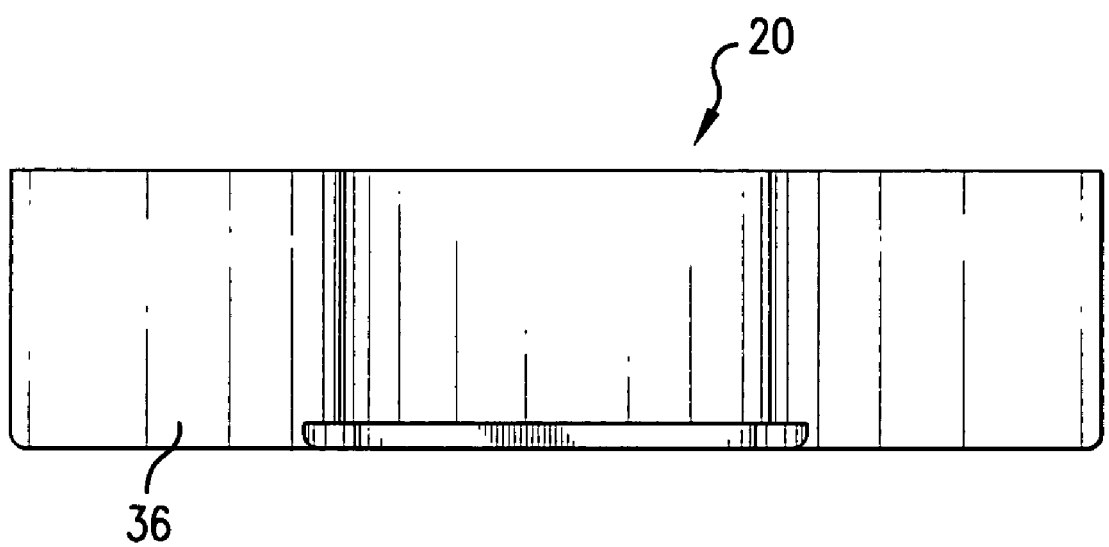
FIG. 5A shows a front view of a preferred embodiment of a manifold block for the valve controller illustrated in FIG. 1B.
Figure 5B:
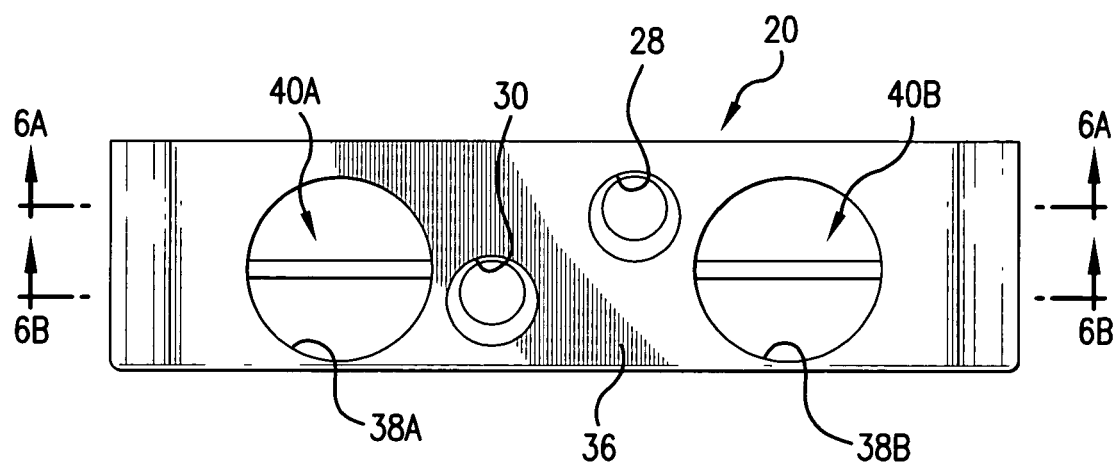
FIG. 5B shows a back view of the preferred embodiment of the manifold block illustrated in FIG. 5A.
Figure 5C:
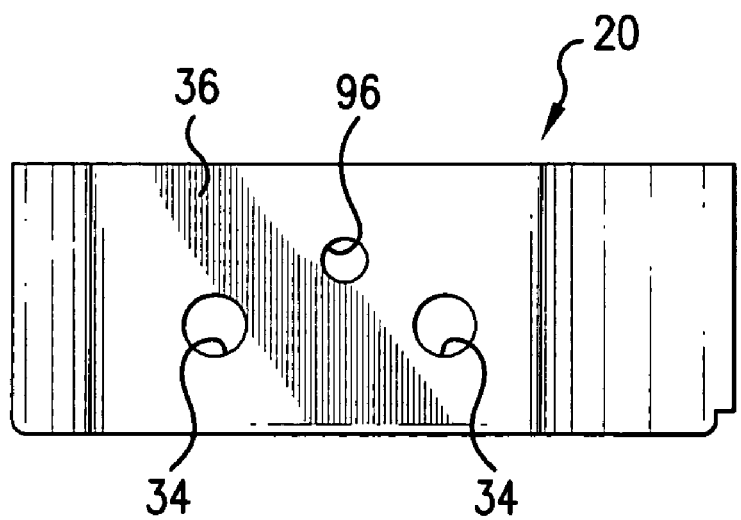
FIG. 5C shows a left side view of the preferred embodiment of the manifold block illustrated in FIG. 5A.
Figure 5D:
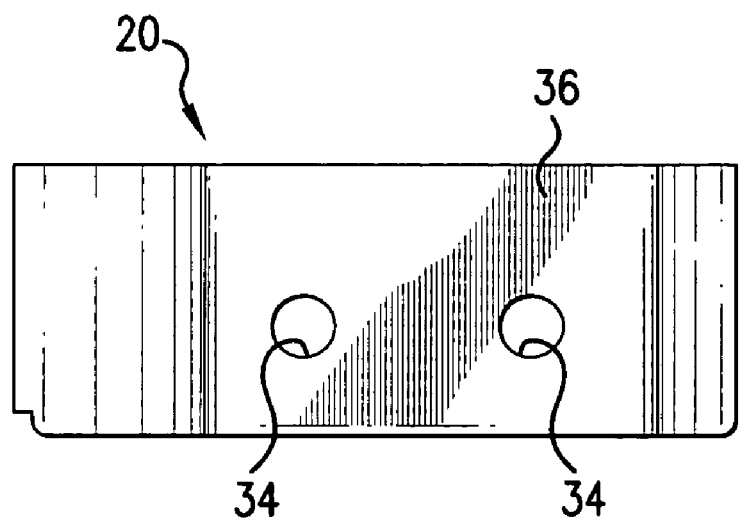
FIG. 5D shows a right side view of the preferred embodiment of the manifold block illustrated in FIG. 5A.
Figure 5E:
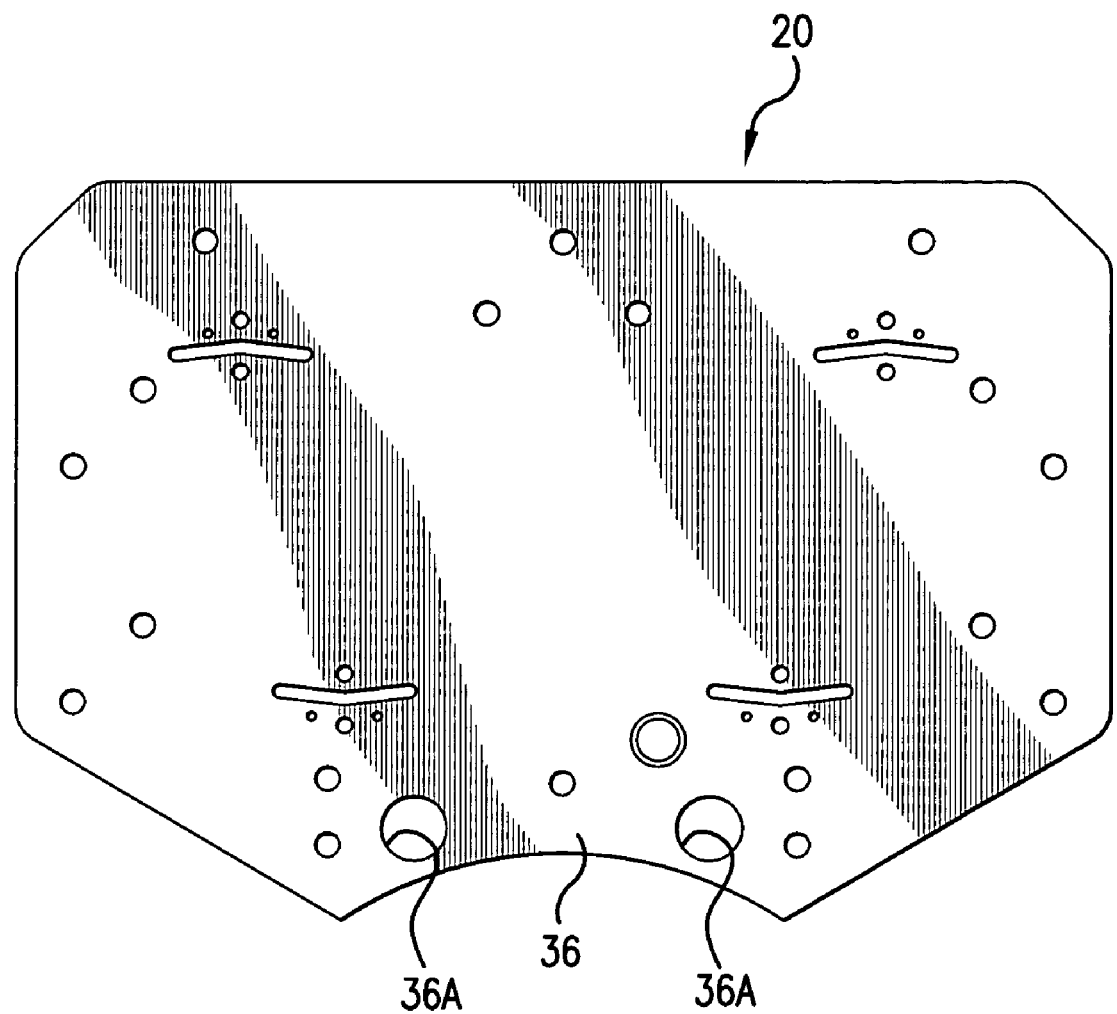
FIG. 5E shows a top view of the preferred embodiment of the manifold block illustrated in FIG. 5A.
Figure 5F:
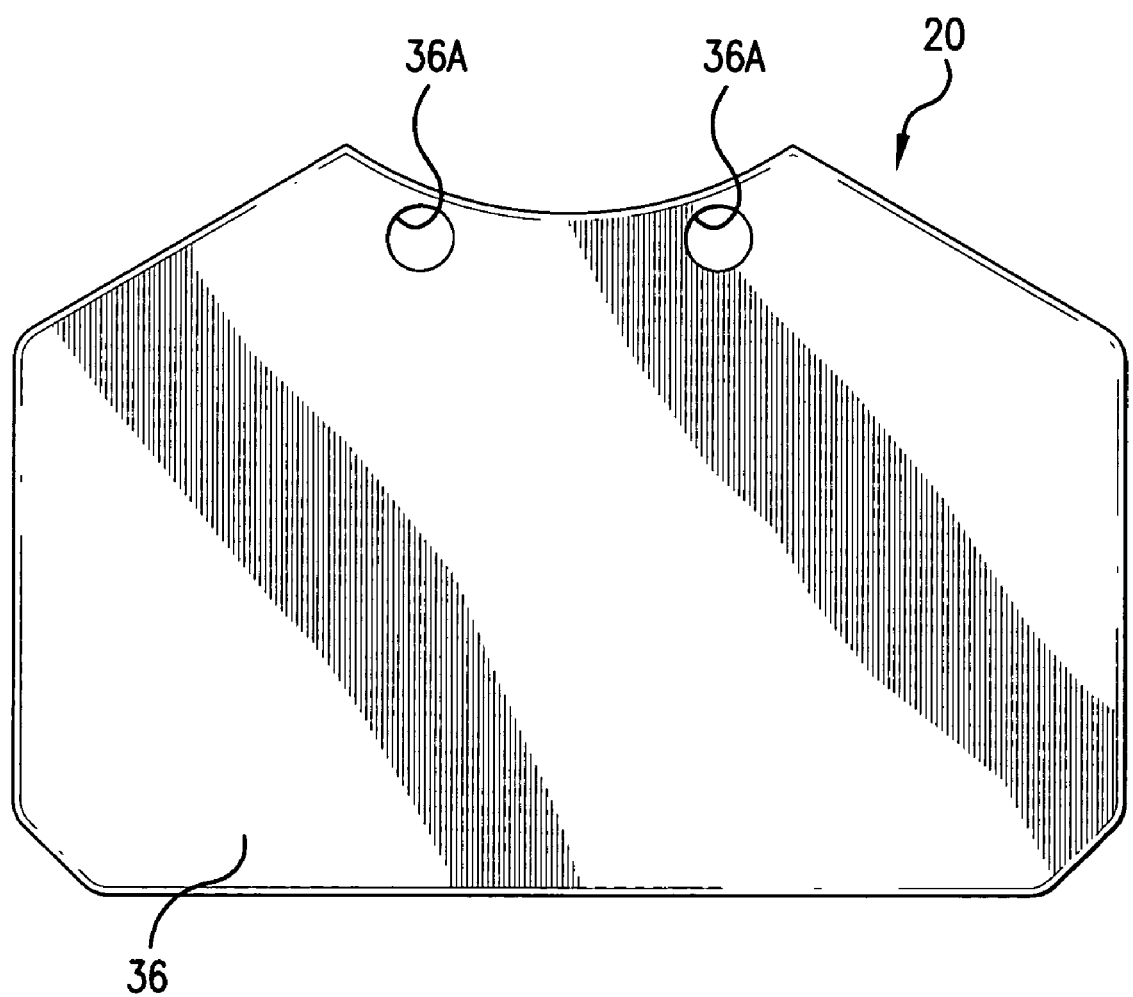
FIG. 5F shows a bottom view of the preferred embodiment of the manifold block illustrated in FIG. 5A.
Figure 5G:
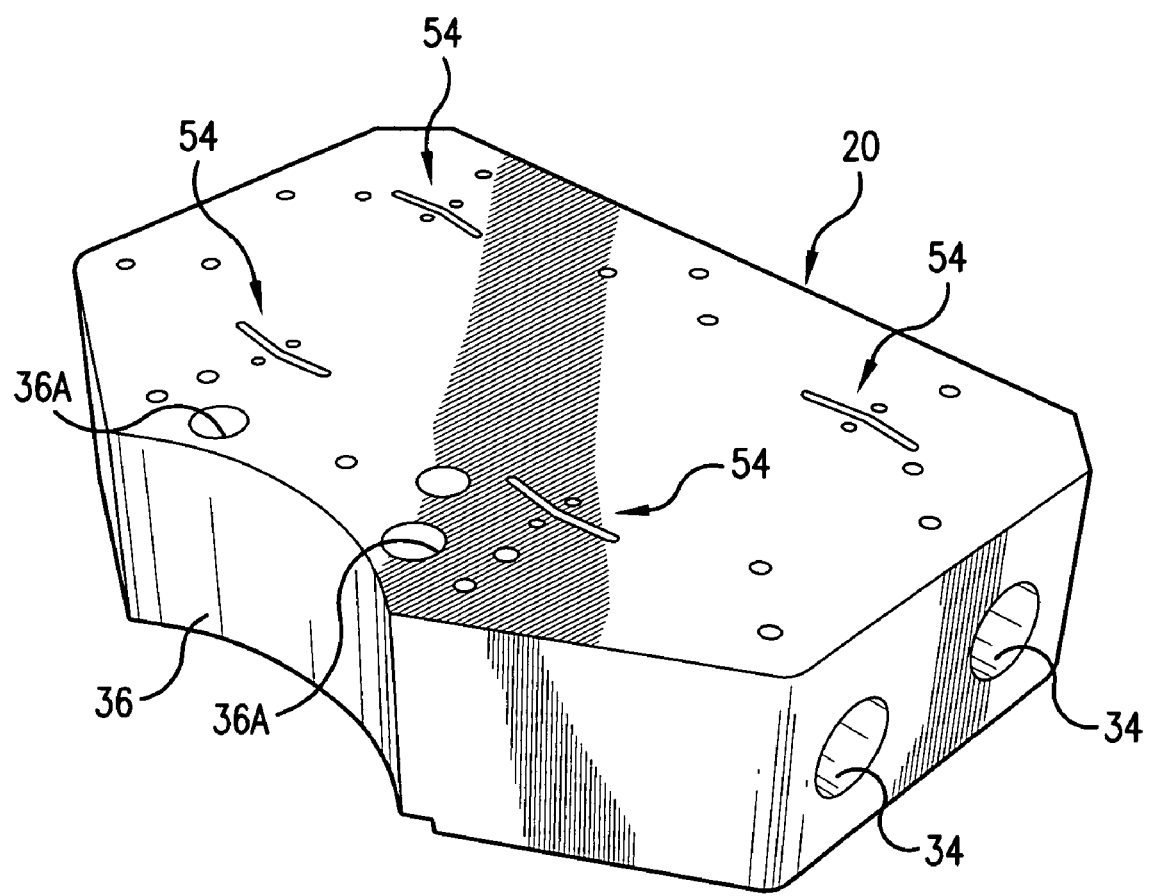
FIGS. 5G and 5H show perspective views of the preferred embodiment of a manifold block illustrated in FIGS. 5A-5F.
Figure 5H:
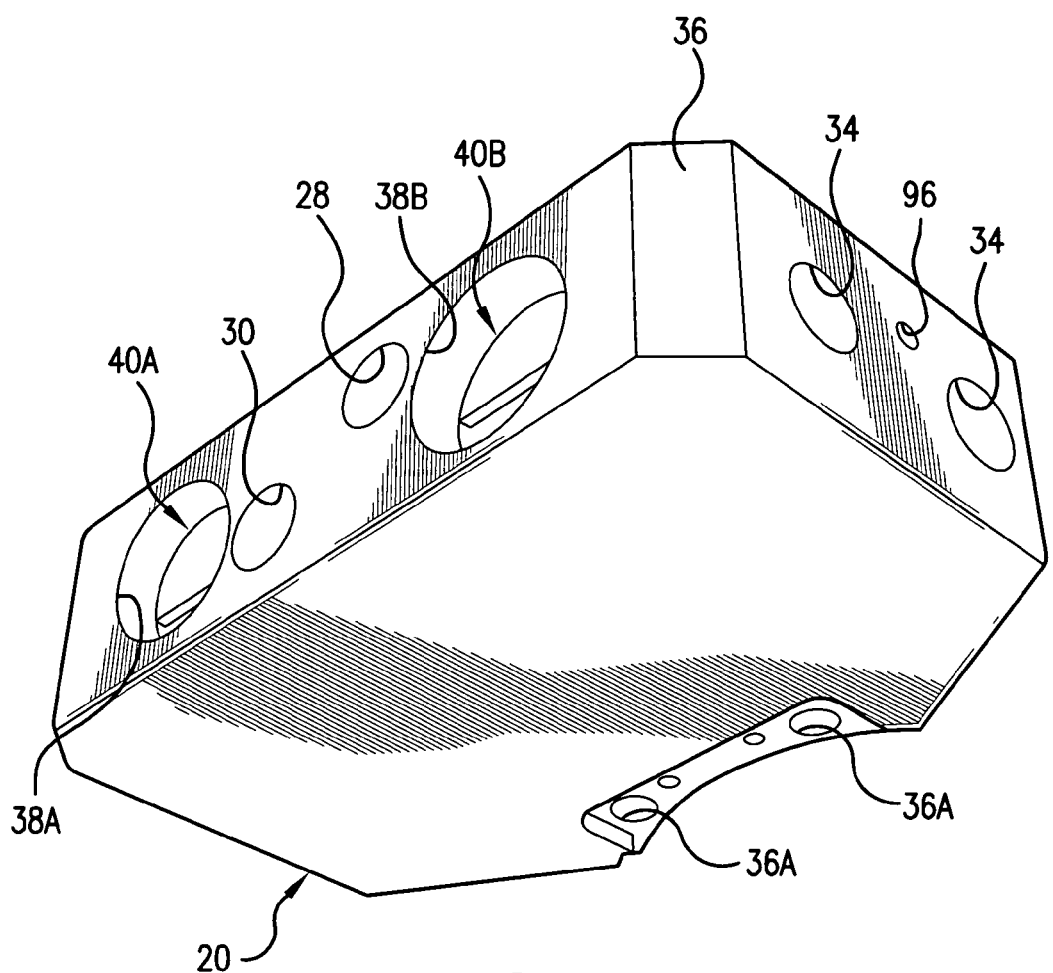

Preferably, the manifold block 36, as shown in FIG. 5E, includes at least one fastener hole 36A for securing the manifold block 36 to the chamber 12.

A system of passages extends into the manifold block 36 from the supply port 28, exhaust port 30, and four transmission ports 32. These passages connect to holes 38A, 38B that are cast, bored or otherwise formed in the manifold block 36, and in which are disposed respective operating media distribution cartridges 40A, 40B. Additionally, as shown in FIG. 1B, for example, in the exterior of the manifold block 36 may support a set of electromagnetic valves 44A-44C and may also support a set of pressure sensor(s) 46A-46C.

Figure 6A:
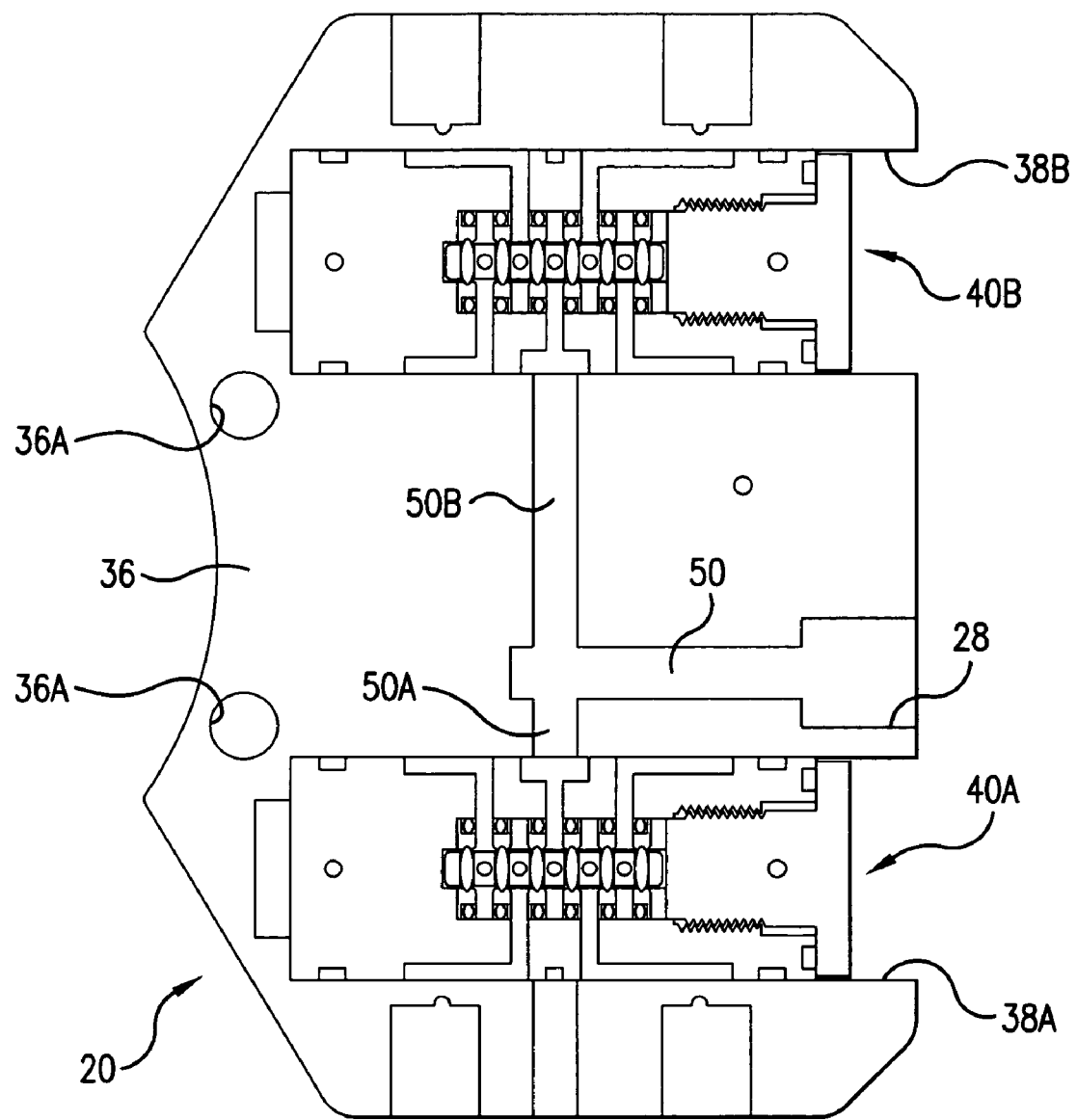
FIG. 6A is a cross-section view taken along line 6A-6A in FIG. 5B.
Figure 6B:
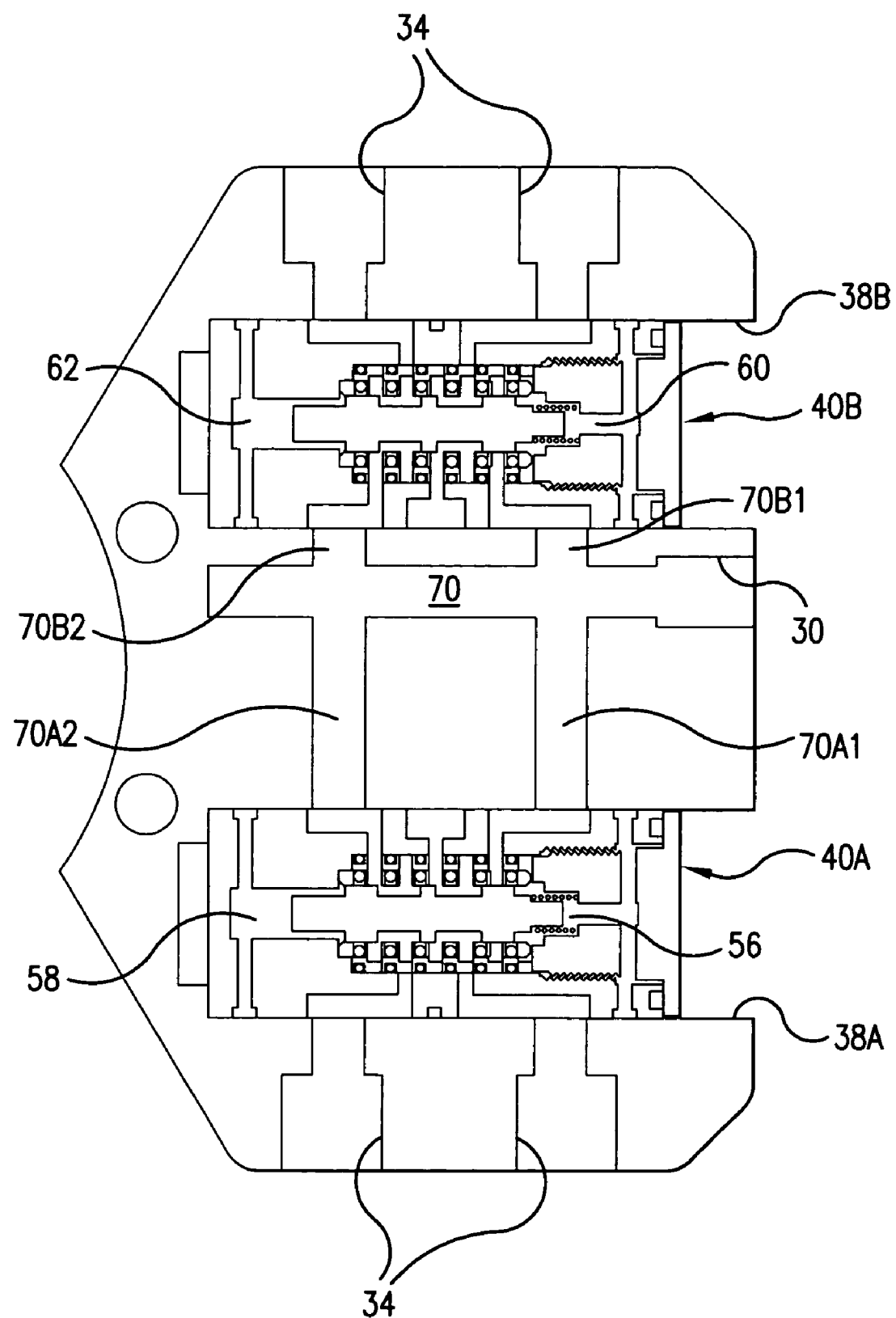
FIG. 6B is a cross-section view taken along line 6B-6B in FIG. 5B.
Figure 6C:
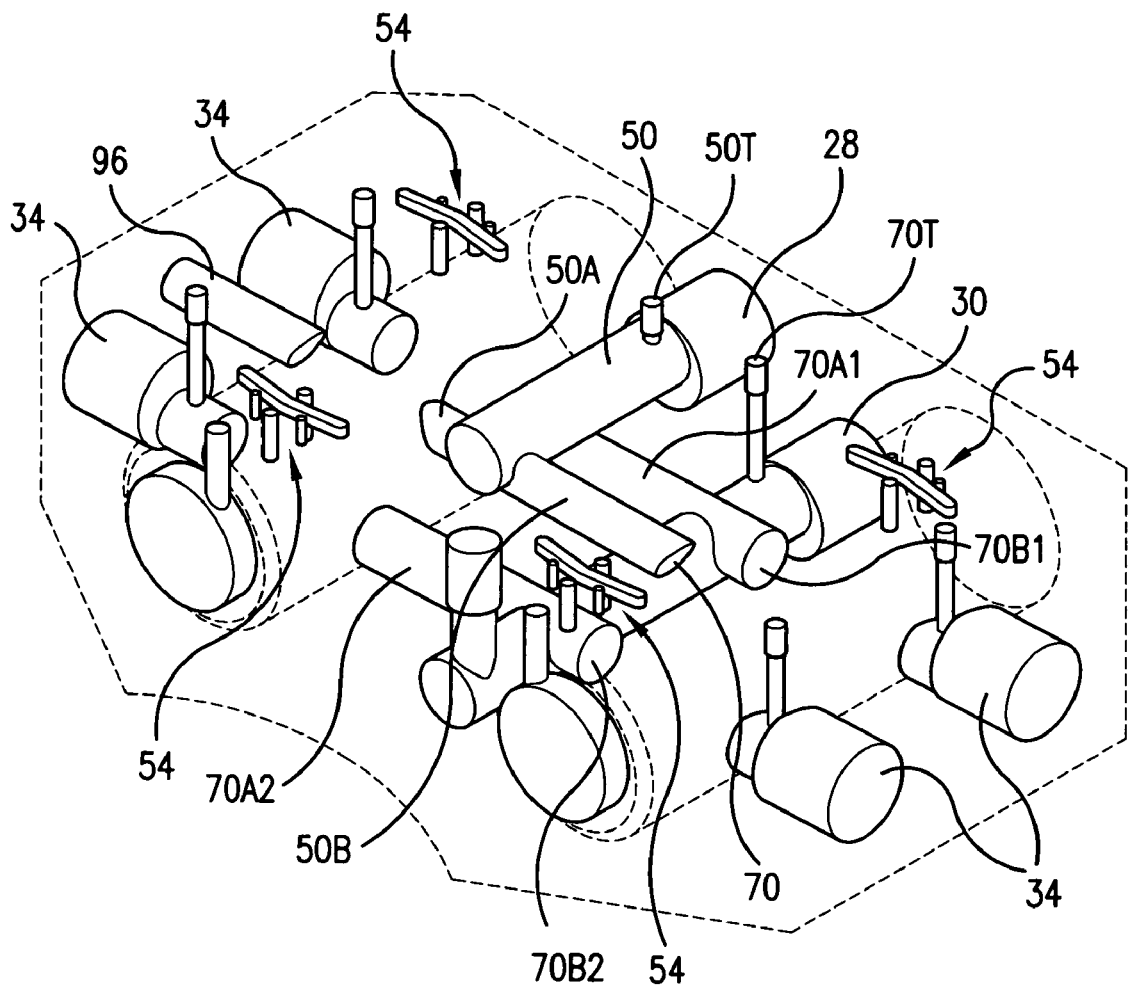
FIG. 6C is an illustration of the system of air passages in the preferred embodiment of the manifold block illustrated in FIGS. 5A-5F.
Figure 7A:
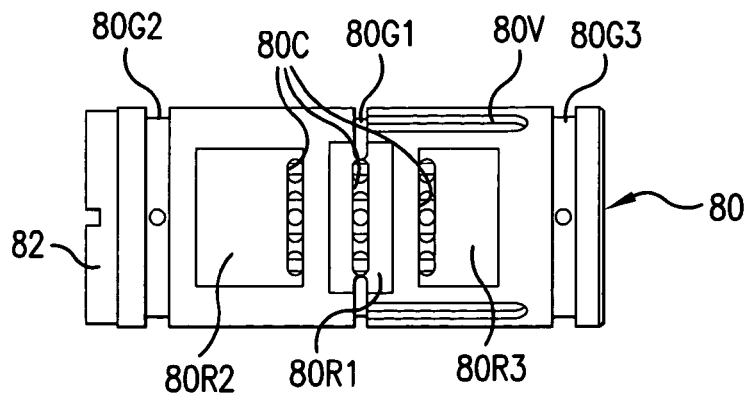
FIG. 7A is an inboard side view of a spool valve assembly cartridge according to a preferred embodiment of the valve controller illustrated in FIG. 11B.
Figure 7B:
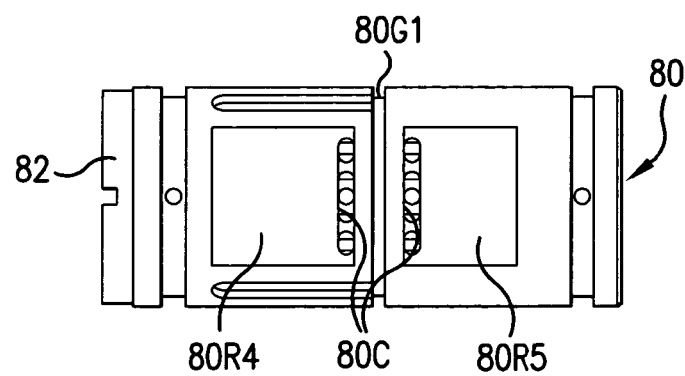
FIG. 7B is an outboard side view of the spool valve assembly cartridge shown in FIG. 7A.
Figure 7C:
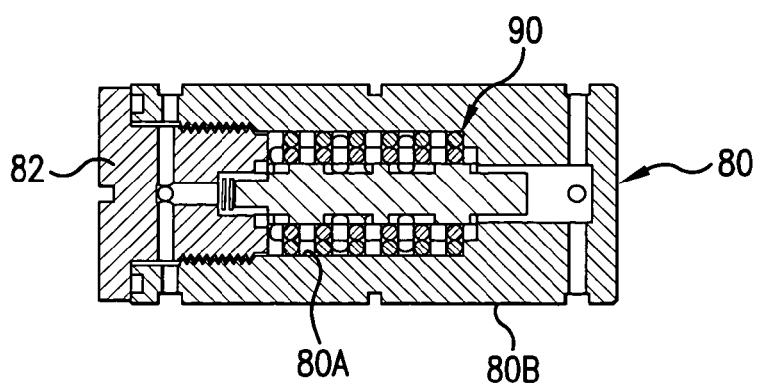
FIG. 7C is a cross-section view of the spool valve assembly cartridge shown in FIG. 7A.
Figure 7D:
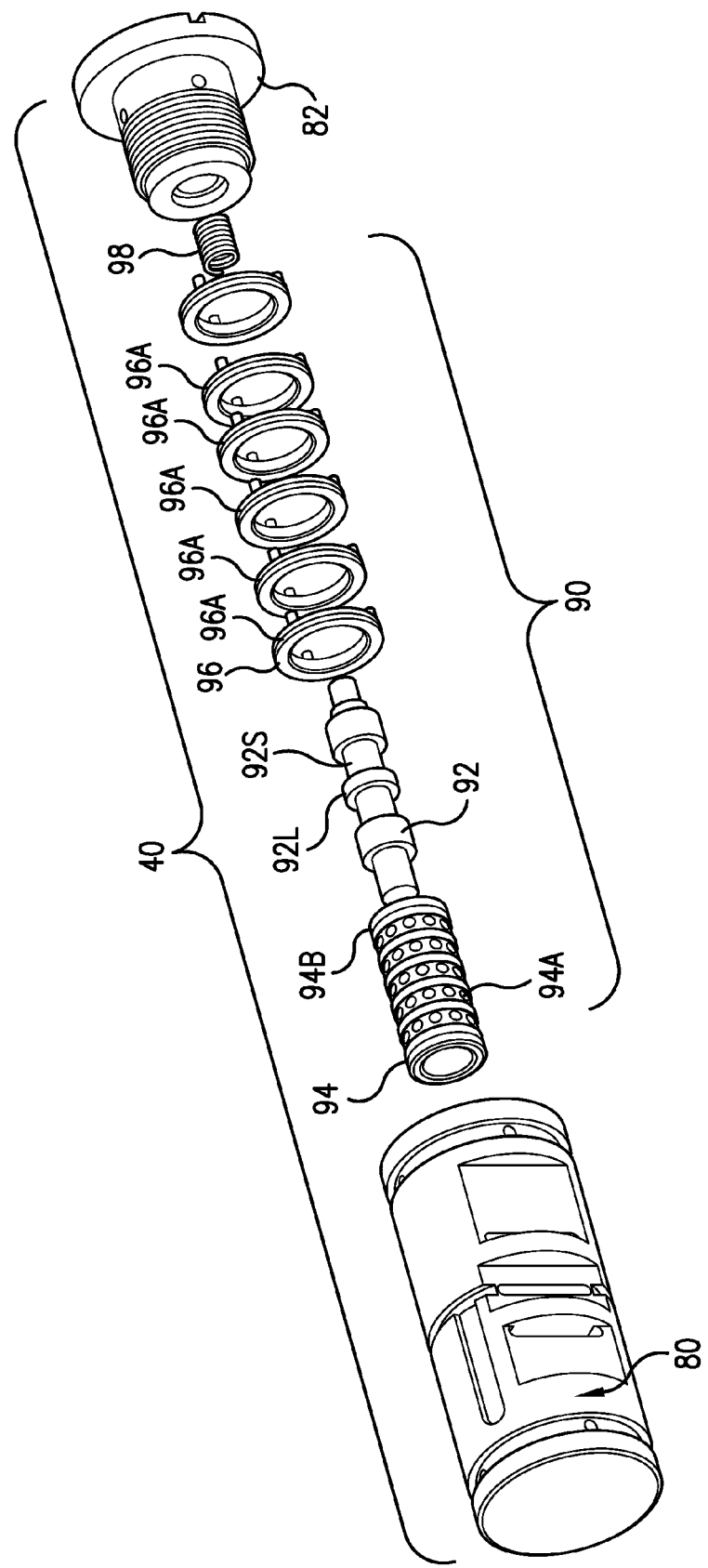
FIG. 7D is an exploded view of the spool valve assembly cartridge shown in FIG. 7A.

With additional reference to FIGS. 6A-6C, the supply port 28 connects to a supply passage 50 that includes first and second supply branches 50A, 50B that respectively connect to the holes 38A, 38B. Thus, an operating media, e.g., air, that is supplied to the manifold assembly 20 via the supply port 28 of the manifold block 36 is directed to the operating media distribution cartridges 40A, 40B via the first and second supply branches 50A, 50B, respectively. The operating media is also supplied from each of the first and second supply branches 50A, S0B to four separate poppet cavities 56,58, 60,62, which set the configuration of the spool valves in the cartridges 40A,40B. The supply of the operating media to the poppet cavities 56,58,60,62 is regulated by the set of electromagnetic valves 44. Preferably, there are four valves, for example, electromagnetic solenoid valves, micro-poppets or piezo valves, 44A, 44B, 44C, 44D that are respectively associated with a corresponding one of the poppet cavities 56, 58, 60, 62. With particular reference to FIG. 6C, the flow of operating media between the supply passage 50 and each of the poppet cavities 56,58,60,62 is via one of the supply branches 50A,50B, via longitudinal passages along the exterior of one of the cartridges 40A,40B (as will be described in greater detail hereinafter), via one of four cavity pressurization and exhaust tap sets 54 (a single set is indicated), and via one of the valves or micro-poppets 44A,44B,44C,44D.

An external port 96 in fluid communication with the supply passage 50 may provide source for sharing the supply of operating media, or for possible emergency pressure relief, emergency shut-down, or emergency blow-down valves.

The exhaust port 30 connects to an exhaust passage 70 that includes first, second, third and fourth exhaust branches 70A1, 70A2, 70B1, 70B2. The exhaust branches 70A1, 70A2 connect to the hole 38A, and the exhaust branches 70B1,70B2 connect to the hole 38B. Thus, operating media that is to be exhausted from the holes 38A, 38B is collected in the exhaust passage 70 via the first, second, third and fourth exhaust branches 70A1, 70A2, 70B1, 70B2. Preferably, a muffler or some other type of damper is connected at the exhaust port 30 to diminish and disperse the operating media that is exhausted.

The set of pressure sensors 46, shown in FIG. 1B, may collect data from the various passages, branch passages, and cavities via respective pressure taps, for example 50T, 70T, 60T, which are connected to one or more sensors, for example 46A, 46B, 46C. Preferably, the pressure sensors 46 can be used to measure operating media supply pressure, manifold exhaust pressure, and the differential pressure across the exhaust branches of each operating media distribution cartridge 40A, 40B. The supply pressure and exhaust pressure sensors may be pressure transducers with one port for receiving airflow. On the other hand, differential pressure sensors are pressure transducers have two ports for receiving and comparing airflow. Plastic tubing may be used to connect each pressure transducer to the respective pressure taps.

Referring to FIGS. 7A-7D, one of the operating media distribution cartridges 40A, 40B will now be described. Each operating media distribution cartridge includes a cylinder 80 and a spool assembly 90. The cylinder 80 extends longitudinally along a cartridge axis and has an inner surface 80A and an outer surface 80B. A plurality of apertures 80C penetrates the cylinder 80 and thereby extends between and connects the inner and outer surfaces 80A, 80B. The inner surface 80A preferably includes one or more and smooth bore portions to receive a spool valve assembly, which may be constructed according to known techniques, and a threaded portion that threadingly engages a cylinder cap 82. The inner surface 80A of the cylinder 80 and the cap 82 each define at respective longitudinal ends one of the aforementioned poppet cavities for displacing the spool assembly 90 between first and second configurations relative to the cylinder 80.

Preferably, the outer surface 80B of the cylinder 80 includes a centrally located circumferential supply groove 80G1 and circumferential poppet grooves 80G2, 80G3 disposed proximate the longitudinal ends of the cylinder 80. The supply groove 80G1 remains in fluid communication with a supply branch of the supply passage 50, and the poppet grooves 80G2, 80G3 provide fluid communication with a respective poppet cavity.

As was briefly mentioned earlier with respect to the flow of operating media between the supply passage 50 and the poppet cavities, the outer surface 80B of the cylinder 80 preferably also includes a plurality of longitudinal valve grooves 80V that extend from the supply groove 80G1 and are parallel to the cartridge axis. The valve grooves 80V define a portion of the flow path that supplies the operating medium to one of the valves or micro-poppets 44A, 44B, 44C, 44D.

One face of the outer surface 80B of the cylinder 80 includes a centrally located supply recess 80R1 and an exhaust recess 80R2, 80R3 on either side of the supply recess 80R1. The supply recess 80R1 is in fluid communication with a supply branch of the supply passage 50, and each of the exhaust recesses 80R2, 80R3 is in fluid communication with a respective exhaust branch of the exhaust passage 70. An opposite face of the outer surface 80B of the cylinder 80 includes a pair of transmission recesses 80R4, 80R5 that are in fluid communications with a respective transmission passage. At least one aperture 80C penetrates the cylinder 80 at each of the recesses 80R1, 80R2, 80R3, 80R4, 80R5.

The spool assembly 90, which may be constructed according to known techniques, preferably includes a centrally disposed spool 92 that extends along the cartridge axis, an annular sleeve 94 that circumscribes the spool 92, and a plurality of spacers 96 that circumscribe the annular sleeve 94. As is well known, the spool 92 includes alternating large diameter bands 92L and small diameter bands 92S that circumscribe the cartridge axis. The end faces of the spool 92 act as pistons that are displaced in response to fluid pressure that is provided in a respective poppet cavity. The sleeve 94 includes a plurality of sets of radial perforations 94A and a plurality of sleeve O-rings 94B that are alternatingly disposed along the cartridge axis. Each of the plurality of spacers 96 includes a spacer O-ring 96A that sealingly engage the inner surface 80A of the cylinder 80.

Preferably, a spring 98 biases the spool 92 with respect to either the cap 82 or the cylinder 80 such that in the absence of operating media pressure, the spool 92 will be displaced to a nominal configuration. Alternatively, a dual spring configuration may be employed such that an additional spring (not shown) biases spool 92 toward cap 82 such that supply 80R4 is blocked by band 92L.

As is well known, the displacement of each spool 92 and the resultant associations of the small diameter bands 92S with particular sets of the radial perforations 94A establishes fluid communication between different passages. Displacement of the spools 92 in the operating media distribution cartridges 40A, 40B is controlled by the valves or micro-poppets 44A, 44B, 44C, 44D selectively diverting operating media to and from the poppet cavities 56, 58, 60, 62 to ultimately control the position of the respective process valve shafts.

Figure 8:
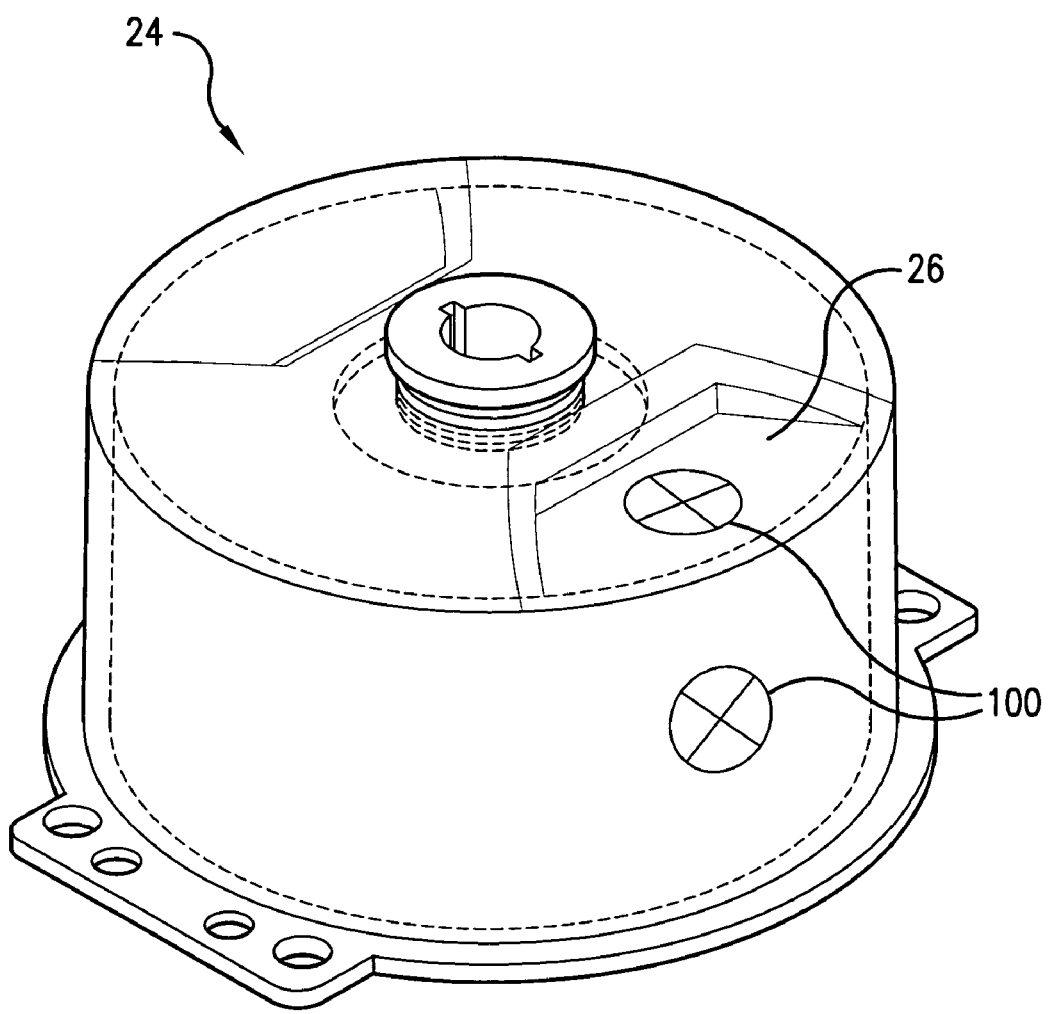
FIG. 8 is a perspective view of a position indicator according to a preferred embodiment of the valve controller illustrated in FIG. 11B.

Referring again to FIG. 1B, and additionally to FIG. 8, the valve position indicator 24 includes a beacon 26 or position indicator that may have markings 100 that are indicative of the position of either or both of two process valves. The beacon (position indicator) 100 can be mounted on to a rotary actuator or remotely wired to a position sensor on the actuator. The position sensor can be a non-contact Hall effect sensor as described in international application no. PCT/US2005/011566, filed 5 Apr. 2005, now WO 2005/097792.

Figure 10A:
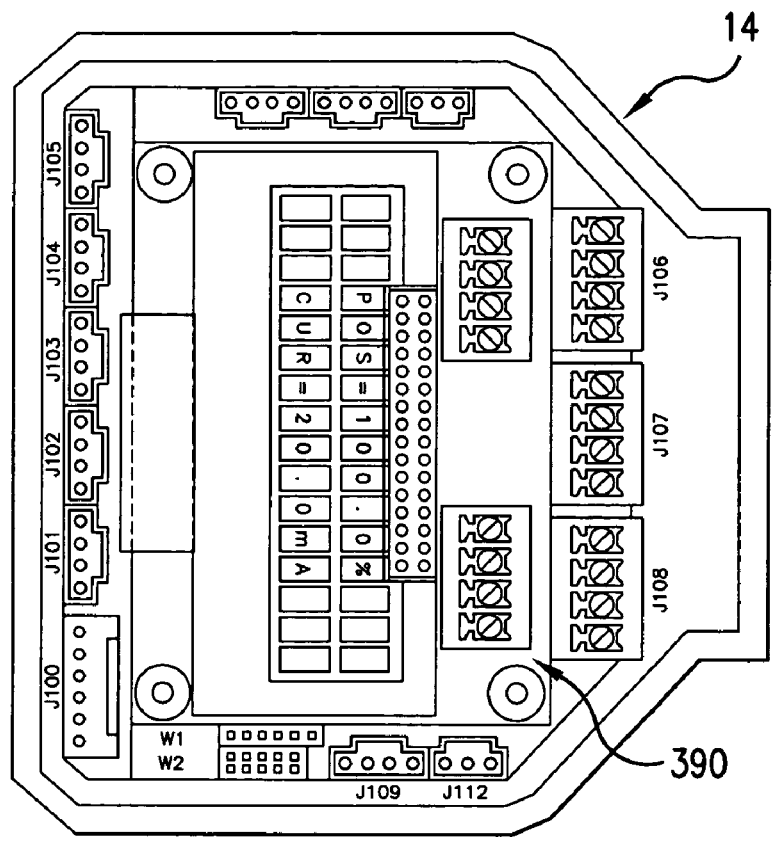
FIG. 10A is a plan view of electrical components of the valve controller illustrated in FIG. 1B.
Figure 10B:
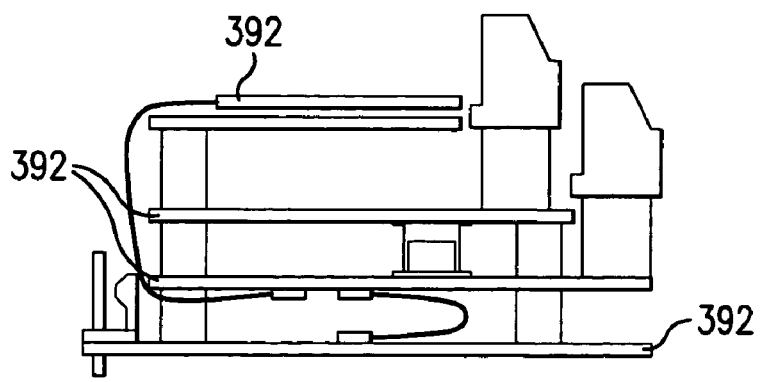
FIG. 10B is a front view of electrical components illustrated in FIG. 10A.

Referring to FIGS. 10A and 10B, electronic components 390 may be arranged or disposed in any suitable fashion within the enclosure 14. For example, circuit boards 392 and other electronic components in the enclosure may be stacked vertically and connected by cable. As shown in FIG. 10B, an exemplary configuration of electronic components has three circuit boards 392 stacked over top each other and spaced apart by varying distances as may be appropriate for the components of each circuit board. Some or all of the components on lower boards 392 located vertically below one or more other boards may still be visible from a plan view. For example, solenoid valve output connections may be located on the third circuit board as enumerated from the top board, yet may still be visible and accessible from the top of the electronic enclosure. Such an arrangement may facilitate installation, maintenance, testing or ascertaining faulty electronic components or circuits.

Figure 11B:
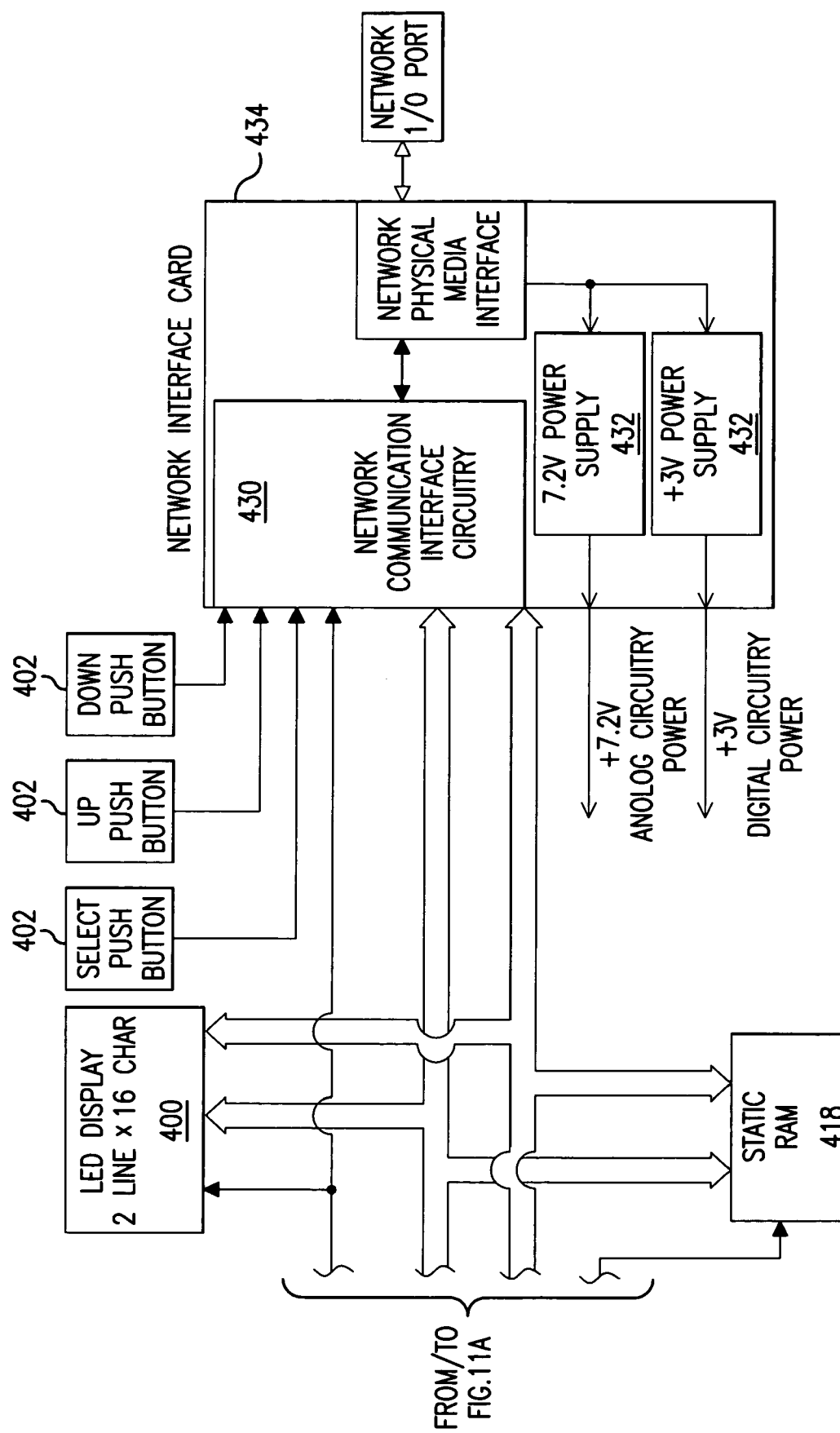
Figure 11C:
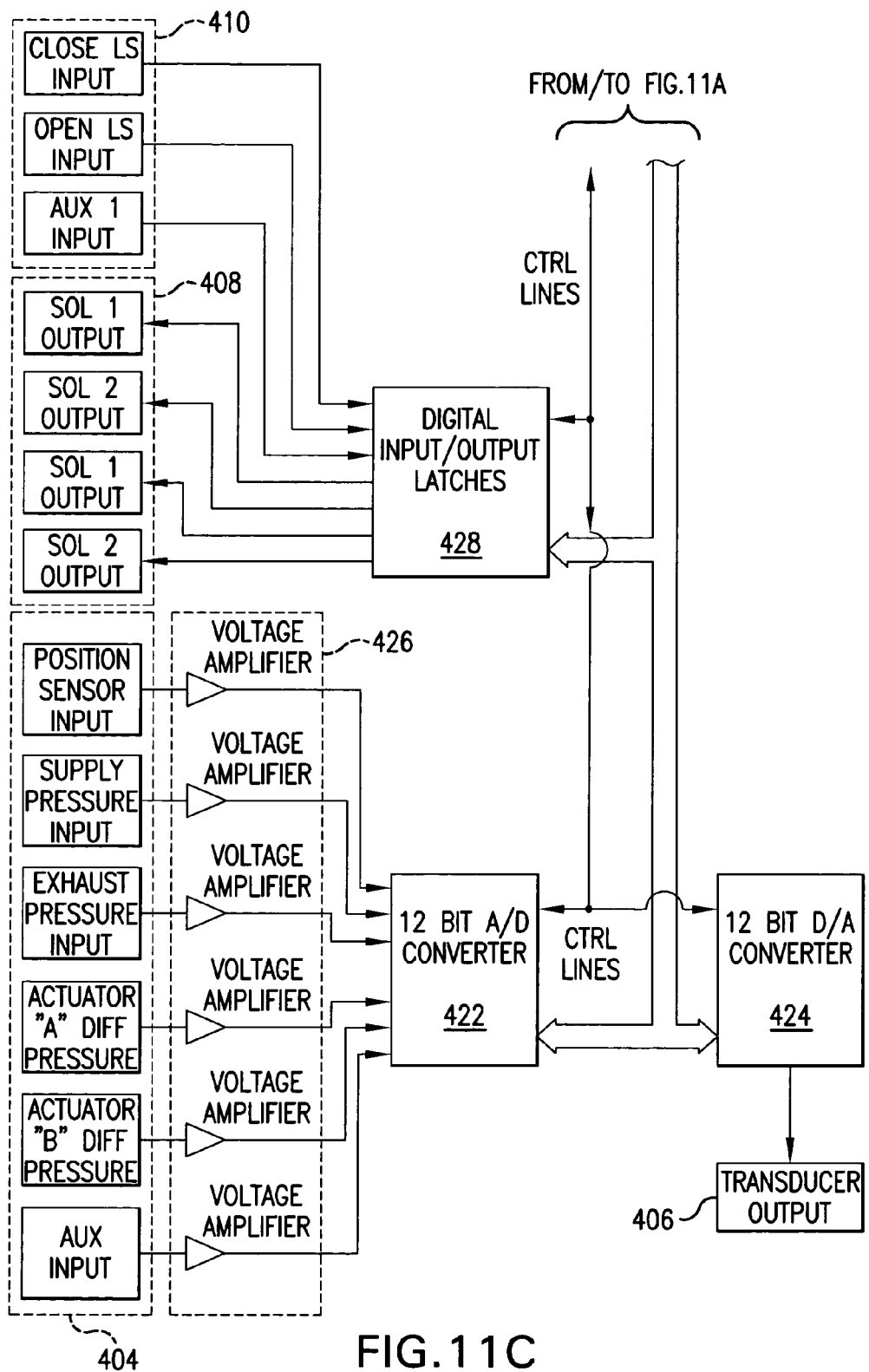

Referring to FIGS. 11A-11C, the electronic components of the valve controller may include a universal mother board having: a 2 Line by 16 Character liquid-crystal display (LCD) 400; Programming buttons (e.g., Select, Next↑, Next↓) 402; Analog Inputs (e.g., one position sensor for measuring valve position from 0.0 to 100.0% (e.g., a Hall Effect Position Sensor), and five Pressure Sensors for measuring air pressure of the supply and manifold) 404; Analog Outputs (e.g., one primary 0-5 milliamps output for driving a transducer, and one secondary 0-5 milliamps output for driving a transducer) 406; Discrete Outputs (e.g., four open collectors for driving solenoids, and one open collector for driving an light emitting diode) 408; Discrete Inputs (e.g., two dry contact sensing inputs for "Open & Close Limit Switches", one dry contact sensing input for "Partial Stroke Switch", and one voltage input for "Sensing SIS Power") 410. Sensors 404 and solenoids 408 provide electrical signals that represent physical characteristics of the medium being monitored. In the case of sensors 404, A/D converter 422 converts the analog signal to a digital signal and along with the solenoid outputs 408 via latches 428, is supplied to microprocessor 414 and flash memory 418 via a databus.

The valve controller electronics may further include: a communications port (e.g., one RS232 for local diagnostics), 412; and a microprocessor 414 with associated peripherals such as, for example, various memory, controllers and converters. For instance, microprocessor CPU 414 can be a Motorola® MC68CK331CPV16 32 bit Microprocessor; Program Memory 416 can include AMD® Am29LV400BT-55REI, 256K×16 bit Flash memory; Data Memory 418 can include a CYPRESS® CY62146VLL-70ZI, 256K×16 bit Static RAM; and Non-Volatile Memory 420 can include an ATMEL® AT25256W-10SI-2.7, 32K×8 bit EEPROM. The valve controller electronics may also include: an Analog to Digital Converter 422 (e.g., Maxim® MAX1295BEEI, 6 Channel 12 bit); a Digital to Analog Converter 424 (e.g., Analog Devices® AD5342BRU, 2 Channel 12 bit); and Analog Instrument Amplifiers 426 (e.g., Texas Instruments® TLC27L4BID, Op-Amps). The valve controller electronics may further include: Discrete Output drivers 428 (e.g., Fairchild® NDS9945, 60V FET's); and Inter-processor communication circuitry 430 (e.g., TI® CD74HC40105M96, 16 Word FIFO). The valve controller electronics has a power supply 432, and may further have a plug-in network card 434 (e.g., ASi®, DeviceNet®, Profibus®, Foundation Fieldbus®, Modbus®, and/or HART®) for additional communication and other capabilities. I/O Port 2 provides programming capability of flash memory 416. I/O Port 1 provides the data gathered by the sensors to various available user interfaces as discussed below and/or via network interface card 434.

The valve controller may include short-range radio links 436 for local interface with the electronic components to provide for a peer-to peer wireless area network. The wireless network may be used, for example, to configure, calibrate, or perform diagnostics on the valve controller electronic systems. As described in more detail below, the wireless network may also be used to monitor and implement knowledge based performance systems. One known technology that uses short-range radio links for local interface is Bluetooth® technology. The valve controller electronics may include a "Bluetooth®" radio module so that the controller is Bluetooth®-capable. When Bluetooth®-capable devices 438 (e.g., Personal Digital Assistants (PDAs), laptop computers, hand phones) come within range of one another, an electronic conversation takes place to determine whether one needs to control the other. The user does not have to press a button or give a command—the electronic conversation happens automatically. Once the conversation has occurred, the devices form a personal-area network or "piconet." Once the piconet is established, the members randomly hop frequencies in unison so they stay in touch with one another. The wireless system may further include one or more security measures which restricts access to the piconet.

In use, the electronic controller monitors electrical signals from the pressure sensors and valve position indicator to control the flow of an appropriate operating medium such as, for example, air through the manifold assembly. Specifically, each solenoid valve or micro poppet 44A,44B,44C,44D opens and closes pathways to one of the poppet cavity 56,58, 60,62, respectively, of the cartridges 40A,40B. In one configuration, the solenoid valve or micro-poppet allows inlet air supply to the poppet cavity. In a second configuration, the solenoid valve or micro-poppet blocks inlet air supply to the poppet cavity, and opens an exhaust path to the atmosphere via the manifold block 36. In this fashion, poppet cavities are energized or de-energized. Each of the operating media distribution cartridges 40A,40B has a pair of opposing poppet cavities. For example, poppet cavity 56 and 58 can constitute the poppet cavities of operating media distribution cartridge 40A, and poppet cavities 60 and 62 can constitute the poppet cavities of operating media distribution cartridge 40B. When one poppet cavity is energized, (i.e., 56) the opposing poppet cavity (i.e., 58) is de-energized. Energizing one poppet cavity while de-energizing another poppet cavity causes a pressure differential across the operating media distribution cartridge 40A, that pushes the spool assembly 90 toward the de-energized cavity and allows the large and small diameter bands 92L,92S on the spool shaft 92 to selectively direct operating media from the supply passage 50 to one of two transmission passages. Reversing the state of the poppet cavities moves the position of the spool shaft 92, and allows the large and small diameter bands 92L,92S on the spool shaft 92 to direct operating media from the supply passage 50 to the second transmission passage. Operating media supplied via the transmission passages drives the process valve actuator.

Figure 12A:
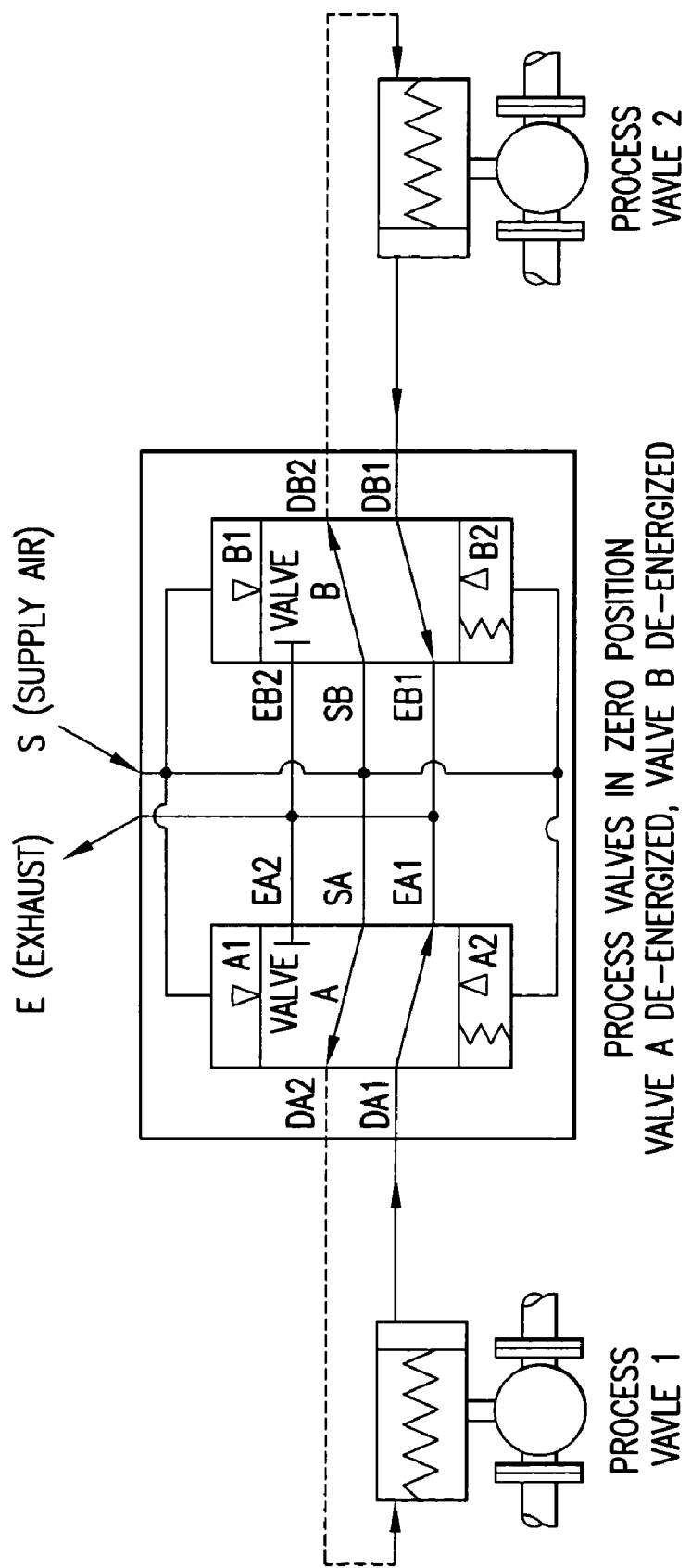
FIG. 12A is a schematic diagram illustrating a first preferred embodiment of a piping system with a valve controller, as shown in FIG. 1B, in an exemplary configuration for independently controlling two process valves. Valve actuators for both process valves are show in a zeroed position.
Figure 12B:
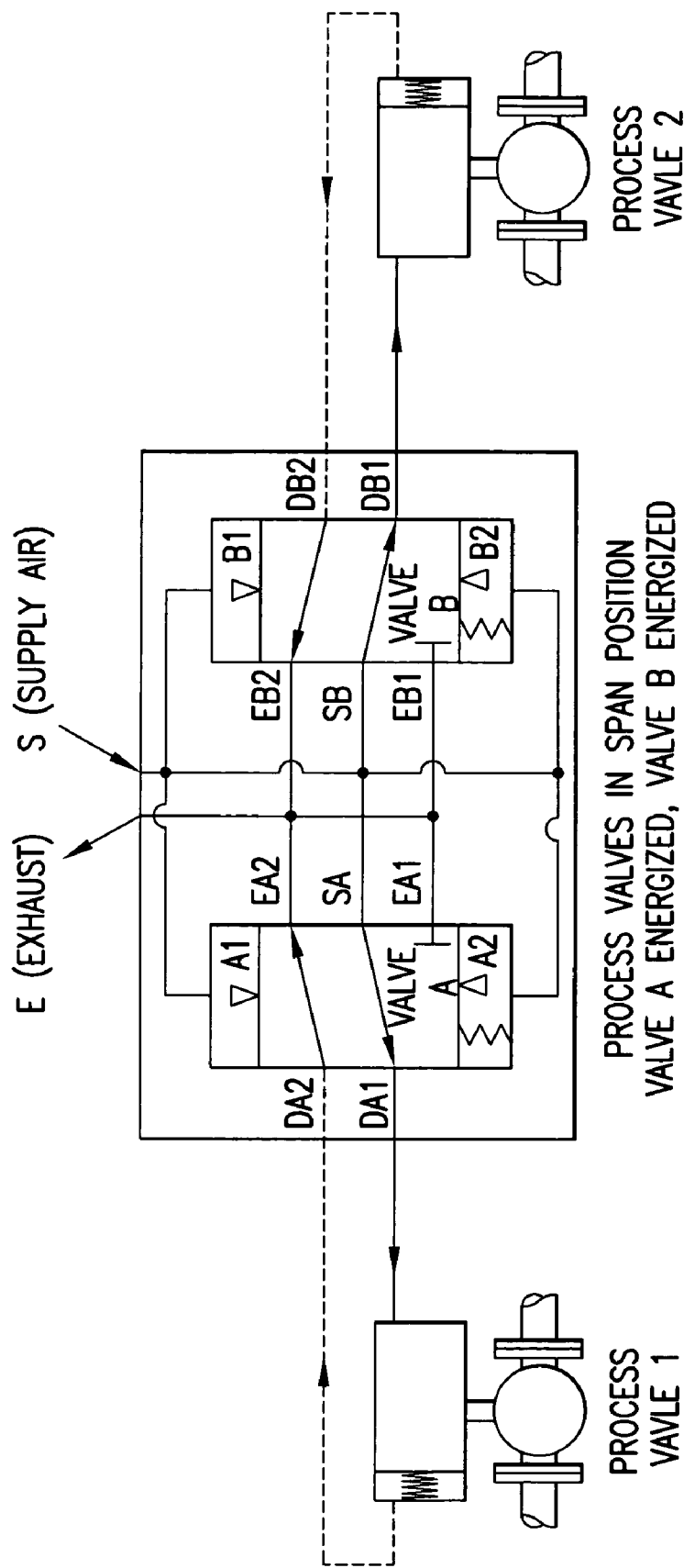
FIG. 12B is a schematic diagram similar to FIG. 12A except showing in a spanned position the valve actuators for both process valves.

FIGS. 12A and 12B illustrate an exemplary manifold design for an operative arrangement that provides control for two independent valves. In particular, the schematic of FIGS. 12A and 12B describe two independent valve controls with one inlet air supply and one exhaust outlet. The single inlet air supply (I/A) is diverted into six separate supply cavities. The single exhaust outlet (E) is diverted into eight exhaust cavities. The inlet air supply cavities are as follows:

- Cavity I/A 1 is to spool cavity SA, 52—This feeds I/A to a primary pneumatic actuator, which energizes and de-energizes a critical valve and/or damper.
- Cavity I/A 2 is to spool cavity SB, 54—This feeds I/A to a secondary pneumatic actuator, which energizes and de-energizes a non-critical valve and/or damper.
- Cavity I/A 3 is to poppet cavity A1, 56—This feeds I/A to the poppet coil E1, 64 that energizes primary spool A, 48.
- Cavity I/A 4 is to poppet cavity A2, 53—This feeds I/A to the poppet coil A2, 66 which de-energizes primary spool A, 48. This cavity may not be required if the application uses a spring return primary spool.
- Cavity I/A 5 is to poppet cavity B1, 60—This feeds I/A to the poppet coil B1, 68 that energizes secondary spool B, 50.
- Cavity I/A 6 is to poppet cavity B2, 62—This feeds I/A to the poppet coil B2, 70 which de-energizes secondary spool B, 50. This cavity may not be required if the application uses a spring return secondary spool.

The EX exhaust cavities are as follows:

- Cavity EX 1 is to exhaust cavity EA1, 72—This allows exhaust to atmosphere of the energizing primary pneumatic actuator port on a de-energizing command of the primary valve.
- Cavity EX 2 is to exhaust cavity EA2, 74—This allows exhaust to atmosphere of the de-energizing primary pneumatic actuator port on an energizing command of the primary valve.
- Cavity EX 3 is to exhaust cavity EB1, 76—This allows exhaust to atmosphere of the energizing secondary pneumatic actuator port on a de-energizing command of the secondary valve.
- Cavity EX 4 is to exhaust cavity EB2, 78—This allows exhaust to atmosphere of the de-energizing secondary pneumatic actuator port on an energizing command of the secondary valve.

Cavity EX 5 is to exhaust cavity PEA1, 80—This allows exhaust to atmosphere of the energizing primary poppet coil port on a de-energizing command of the primary valve.

Cavity EX 6 is to exhaust cavity PEA2, 82—This allows exhaust to atmosphere of the de-energizing primary poppet coil port on an energizing command of the primary valve.

Cavity EX 7 is to exhaust cavity PEB 1, 84—This allows exhaust to atmosphere of the energizing secondary poppet coil port on a de-energizing command of the secondary valve.

Cavity EX 8 is to exhaust cavity PEB2, 86—This allows exhaust to atmosphere of the de-energizing secondary poppet coil port on an energizing command of the secondary valve.

Figure 13A:
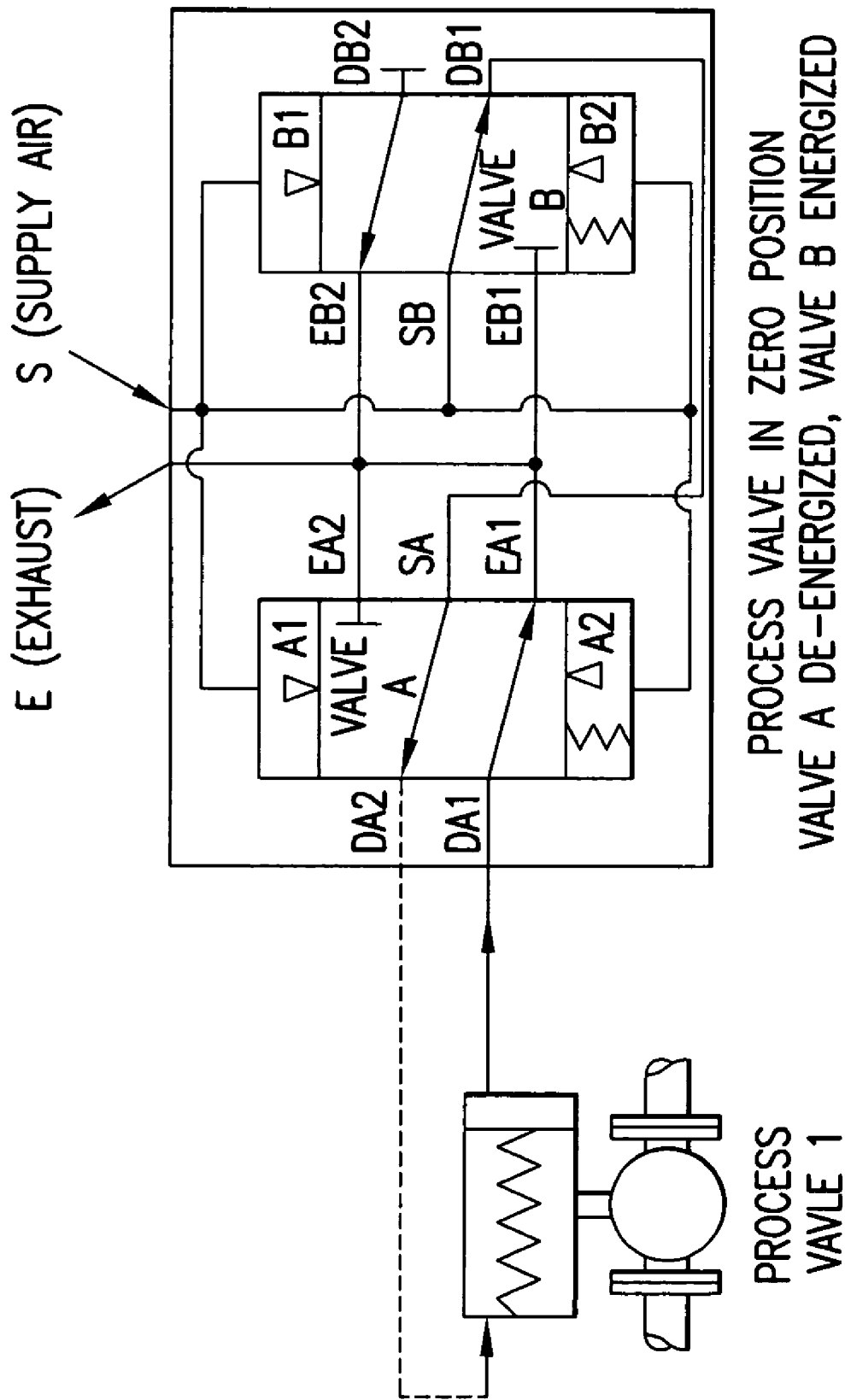
FIG. 13A is a schematic diagram illustrating a second preferred embodiment of a piping system with a valve controller, as shown in FIG. 1B, in an exemplary configuration for controlling one process valve. The valve actuator for the process valve is shown in a zeroed position.
Figure 13B:
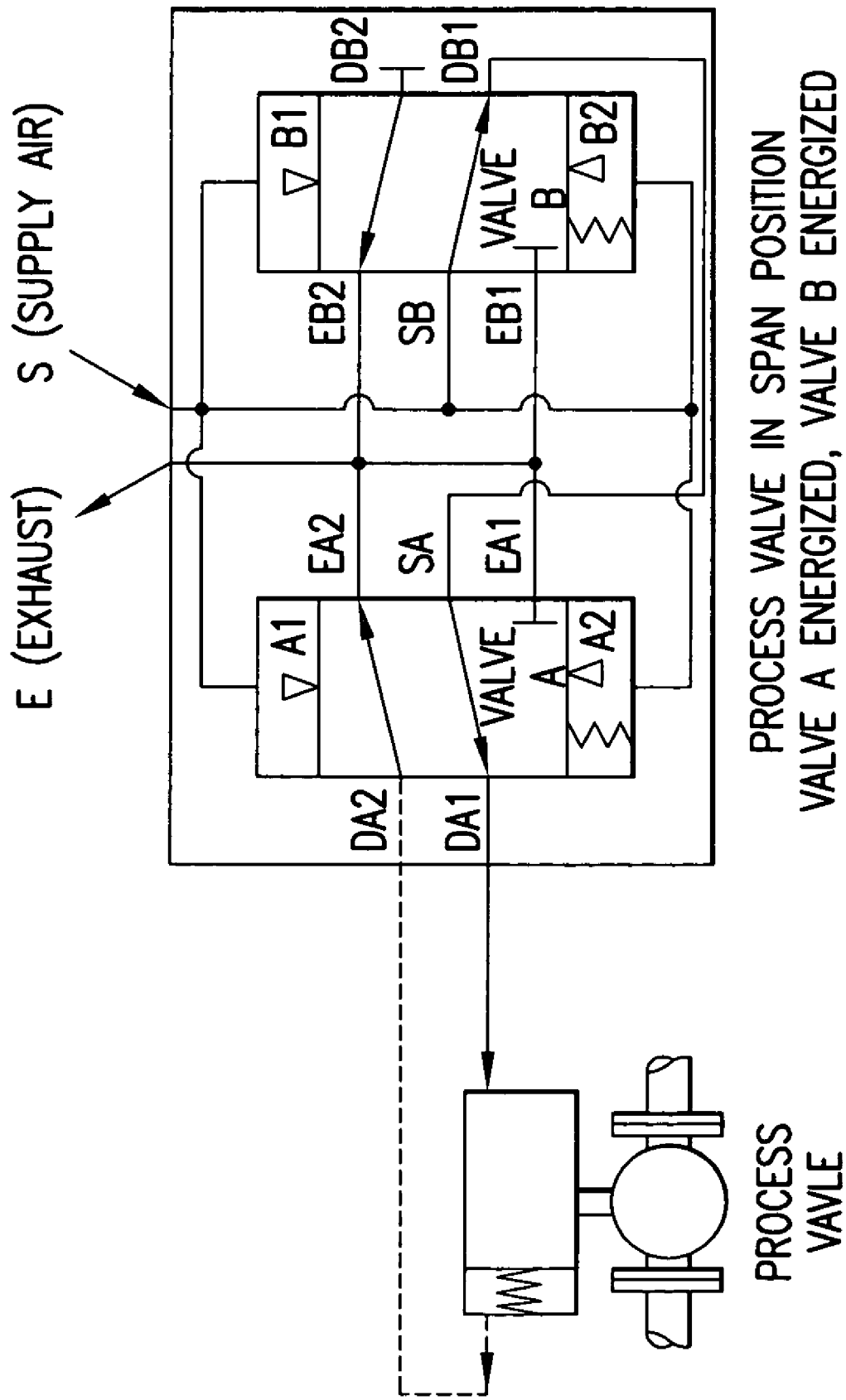
FIG. 13B is a schematic diagram similar to FIG. 13A except showing in a spanned position the valve actuator for the process valve.
Figure 13C:
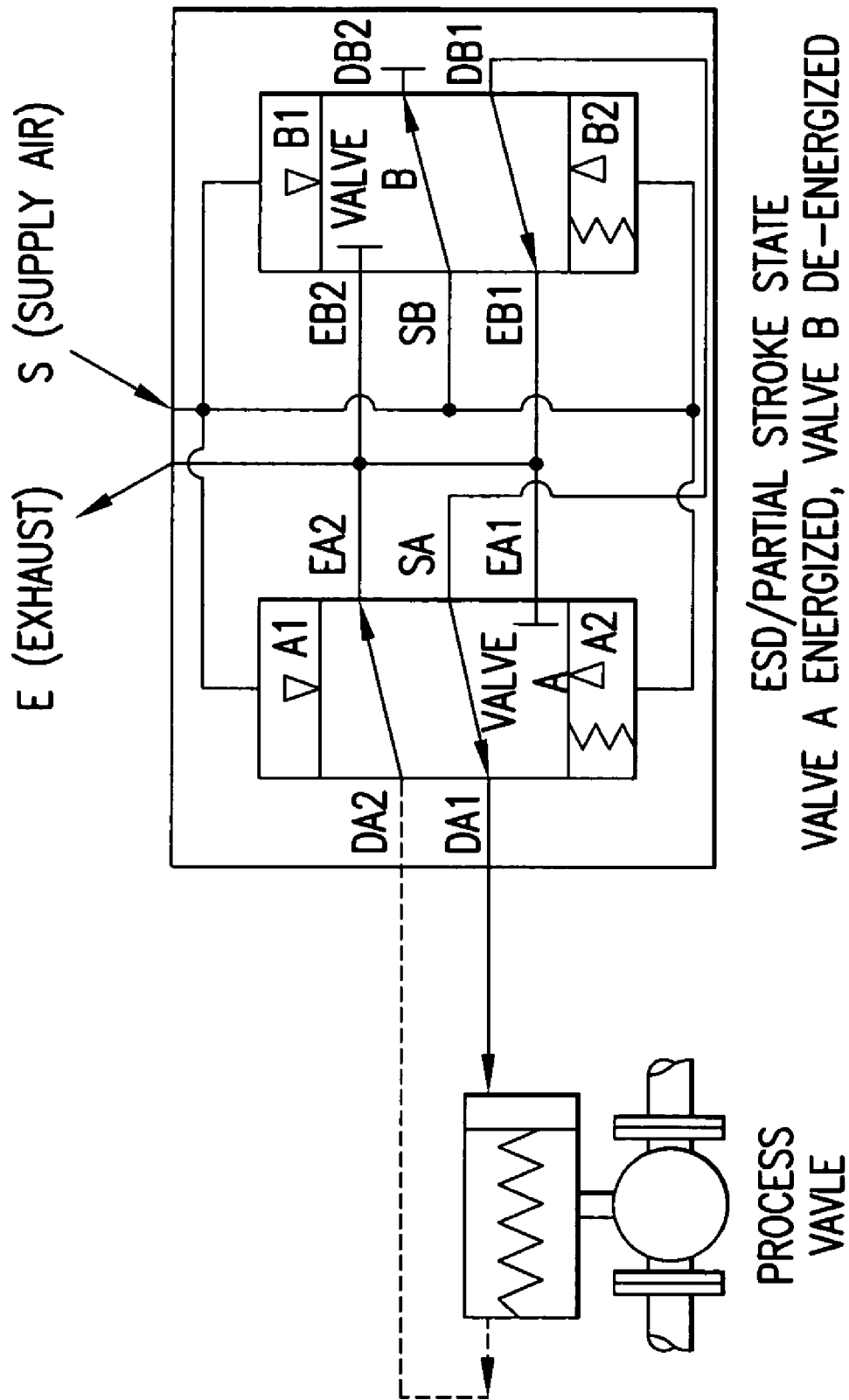
FIG. 13C is a schematic diagram similar to FIGS. 13A and 13B except showing in a partially stroke position the valve actuator for the process valve.

FIGS. 13A-13C illustrate an exemplary manifold design for an operative arrangement that provides control for a single process valve. In particular, the schematics of FIGS. 13A-13C describe a single valve control by two dependent spool valves with one inlet air supply and one exhaust outlet. The single inlet air supply (I/A) is diverted into five (5) separate supply cavities. The single exhaust outlet (EX) is diverted into eight exhaust cavities. The I/A supply cavities are as follows:

Cavity I/A 1 is to spool cavity SB, 54—This feeds I/A to the secondary spool B, 50, which when energized will supply I/A to the primary spool A, 48, authorizing control of the pneumatic actuator. This is intended for use in Emergency Shut Down and Partial Stroke Testing of a critical valve and/or damper.

Cavity I/A 2 is to poppet cavity A1, 56—This feeds I/A to the poppet coil A1, 64 that energizes primary spool A, 48.

Cavity I/A 3 is to poppet cavity A2, 58—This feeds I/A to the poppet coil A2, 66, which de-energizes primary spool A, 48. (This cavity may not be required if the application uses a spring return primary spool.)

Cavity I/A 4 is to poppet cavity B1, 60—This feeds I/A to the poppet coil B1, 68 that energizes secondary spool B, 50.

Cavity I/A 5 is to poppet cavity B2, 62—This feeds I/A to the poppet coil B2, 70 which de-energizes secondary spool B, 50. (This cavity may not be required if the application uses a spring return secondary spool.)

The EX exhaust cavities are as follows:

Cavity EX 1 is to exhaust cavity EA1, 72—This allows exhaust to atmosphere of the energizing pneumatic actuator port on a de-energizing command of the valve and/or damper under normal operating conditions.

Cavity EX 2 is to exhaust cavity EA2, 74—This allows exhaust to atmosphere of the de-energizing pneumatic actuator port on an energizing command of the valve and/or damper under normal operating conditions.

Cavity EX 3 is to exhaust cavity EB1, 76—This allows exhaust to atmosphere of the energizing port of the authorization spool B on a de-energizing command for Emergency Shut Down and/or Partial Stroke Test requirements.

Cavity EX 4 is to exhaust cavity EB2, 78—This allows exhaust to atmosphere of the de-energizing of the authorization spool B on an energizing command for normal operating conditions.

Cavity EX 5 is to exhaust cavity PEA1, 80—This allows exhaust to atmosphere of the energizing primary poppet coil port on a de-energizing command of the valve and/or damper under normal operating conditions.

Cavity EX 6 is to exhaust cavity PEA2, 82—This allows exhaust to atmosphere of the de-energizing primary poppet coil port on an energizing command of the valve and/or damper under normal operating conditions.

Cavity EX 7 is to exhaust cavity PEB1, 84—This allows exhaust to atmosphere of the energizing authorization poppet coil port on a de-energizing command for Emergency Shut Down and/or Partial Stroke Test requirements. The specification for a known ESD valve monitor known from the related art, and a discussion of partial stroke testing may be found in international application no. PCT/US2005/011566, filed 5 Apr. 2005, now WO 2005/097792.

Cavity EX 8 is to exhaust cavity PEB2, 86—This allows exhaust to atmosphere of the de-energizing authorization poppet coil port on an energizing command for normal operating conditions.

Figure 14B:
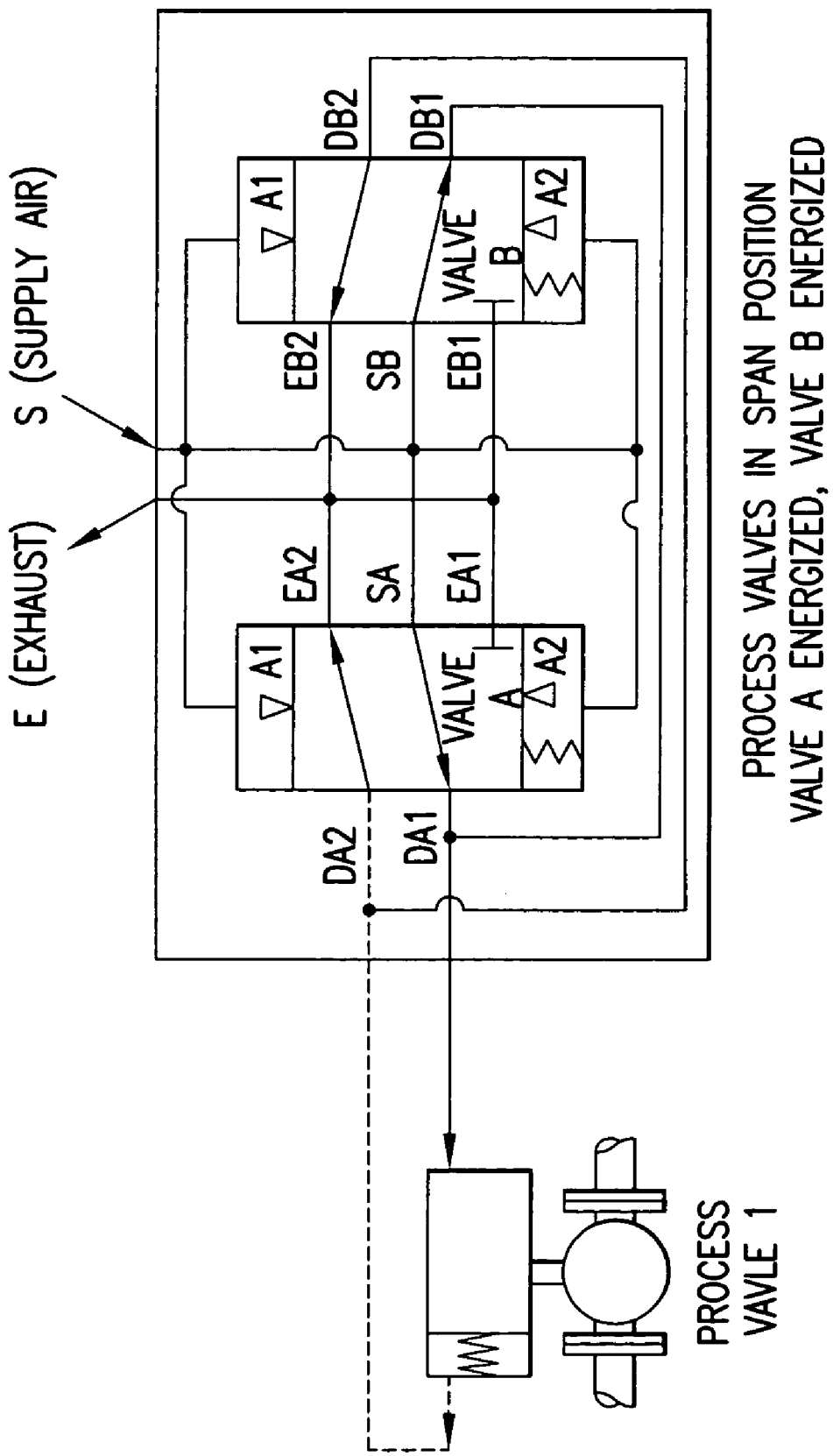
FIG. 14B is a schematic diagram similar to FIG. 14A except showing in a spanned position the valve actuator for the process valve.

FIGS. 14A and 14B illustrate another exemplary manifold design for an redundant operative arrangement that provides control of a single process valve by two spool valves. In particular, the schematics of FIGS. 14A and 14B describe two dependent spool valves controlling one primary pneumatic actuator with one inlet air supply and one exhaust outlet. These redundancy configurations require a downstream valve (not shown) with each supply feeding a pneumatic actuator. These operative arrangements may allow for increased airflow dynamics for the pneumatic actuator while utilizing a single inlet supply and single outlet exhaust. The single inlet air supply (I/A) is diverted into six (6) separate supply cavities. The single exhaust outlet (EX) is diverted into eight exhaust cavities. The I/A supply cavities are as follows:

Cavity I/A 1 is to spool cavity SA, 52—This feeds I/A to a primary pneumatic actuator, which energizes and de-energizes a valve or damper.

Cavity I/A 2 is to spool cavity SB, 54—This feeds I/A to a primary pneumatic actuator, which energizes and de-energizes a valve or damper.

Cavity I/A 3 is to poppet cavity A1, 56—This feeds I/A to the poppet coil A1, 64 that energizes spool A, 48.

Cavity I/A 4 is to poppet cavity A2, 58—This feeds I/A to the poppet coil A2, 66 that de-energizes spool A, 48. This cavity may not be required if the application uses a spring return spool.

Cavity I/A 5 is to poppet cavity B 1, 60—This feeds I/A to the poppet coil B1, 68 that energizes spool B, 50.

Cavity I/A 6 is to poppet cavity B2, 62—This feeds I/A to the poppet coil B2, 70 that de-energizes spool B, 50. This cavity may not be required if the application uses a spring return spool.

The EX exhaust cavities are as follows:

Cavity EX 1 is to exhaust cavity EA1, 72—This allows exhaust to atmosphere of the energizing pneumatic actuator port on a de-energizing command of the valve.

Cavity EX 2 is to exhaust cavity EA2, 74—This allows exhaust to atmosphere of the de-energizing pneumatic actuator port on an energizing command of the valve.

Cavity EX 3 is to exhaust cavity EB1, 76 at the same time as the EA1, 72—This allows exhaust to atmosphere of the energizing pneumatic actuator port on a de-energizing command of the valve.

Cavity EX 4 is to exhaust cavity EB2, 78 at the same time as the EA2, 74—This allows exhaust to atmosphere of the de-energizing pneumatic actuator port on an energizing command of the valve.

Cavity EX 5 is to exhaust cavity PEA1, 80 this allows exhaust to atmosphere of the energizing poppet coil port on a de-energizing command of the valve.

Cavity EX 6 is to exhaust cavity PEA2, 82 this allows exhaust to atmosphere of the de-energizing poppet coil port on an energizing command of the valve.

Cavity EX 7 is to exhaust cavity PEB1, 84 at the same time as the PEA1, 80 this allows exhaust to atmosphere of the energizing poppet coil port on a de-energizing command of the valve.

Cavity EX 8 is to exhaust cavity PEB2, 86 at the same time as the PEA2, 82 this allows exhaust to atmosphere of the de-energizing poppet coil port on an energizing command of the valve.

The electronic and mechanical components of the valve controller according to the preferred embodiments may further provide for intelligent diagnostics for integrated actuator/valve packages. For instance, operational data from the valve controller may be collected and analyzed to signal maintenance information and/or prevent potentially dangerous process conditions. Environmental learning and diagnostics and fault monitoring may be referred to collectively as developing and implementing a knowledge based valve performance program. For example, a valve controller with integral pressure sensors may be used to profile pressures of a single supply port, a single exhaust port and a differential pressure sensor so that diagnostics and fault monitoring can be accomplished with a microprocessor. The diagnostics may comprise developing the following non-limiting and exemplary profiles:

a "Commissioned and/or Maintenance Torque Profile"—this function may record the installed valve actuator torque demand. It may be used, for example, to determine whether any fouling of the disc or deformation of the seat to has occurred. In addition, during shutdown a "Maintenance Profile" may be obtained for comparison to torque profile. Moreover, a commission torque profile may also be developed during start-up operations (a start-up profile) that may be used as the reference profile for use by the continuous diagnostics. Initially, such comparisons would require the skill and knowledge of the commissioning and maintenance engineers. However, such comparisons may also be analyzed by an integrated actuator controller according to the preferred embodiments.

The fault monitoring may comprise the following non-limiting exemplary functions:

"Insufficient Line Pressure to Guarantee Correct Operation"—the purpose of this function may be to warn that air supply pressure may not be sufficient to guarantee either opening or closing of the valve;

"Supply Pressure Failure"—the purpose of this function may be to raise an alarm if line pressure falls below the maximum average differential requirements or is zero;

"Valve Shaft Bent"—the purpose of this function may be to detect if the shaft is bent (for example, this may be achieved by detecting a phase shift of the torque profile);

"Valve Not Achieving Full Stroke"—the purpose of this function may be to evaluate the span of movement of the valve and issue a warning if pre-defined limits are exceeded;

"Backlash Detection"—the purpose of this function may be to detect and identify dynamic loading on the valve and provide an opportunity to prevent premature valve/actuator failure (the torque/speed profile and the transients produced by conditions of dynamic loading may be used to detect the presence of backlash, which may be caused by a worn actuator, slack mountings, ill fitting of shaft to valve or other correctable features of the valve actuator system;

"Torque Demand of Valve Approaching Actuator limit"—the purpose of this function may be to raise a warning or alarm if differential pressure reaches 90% of the line pressure at any time during cycle (a bypass time, however, may be included to inhibit or suppress the warning or alarm, immediately after control signal is received;

"Valve Seating/Break-Out Torque Monitoring"—the purpose of this function is to identify the torque required to seat and unseat the valve and then give an indication of seat wear, liner failure and/or other mechanical conditions that may require maintenance or immediate attention (values may be compared to acceptable limits for particular valve types and warnings issued under triggering conditions);

"Torque Limit Exceeded"—the purpose of this function may be to prevent the torque on the valve stem from exceeding a pre-set limit that may be programmable and which may be set as a function of a published limit (an alarm may be set if appropriate);

"Close on Torque"—the purpose of this function may be to ensure that actuators would have sufficient torque to unseat the valve, remove any dependence on spring rate vs. air supply pressure to achieve a closing torque, and may relate to the use of a dual coil spring center of spool to limit torque output;

"Shaft Broken"—the purpose of this function may be to determine whether the valve shaft is broken or the valve actuator is not attached to the valve, each of these conditions may have a torque profile with a torque level lower than the historical demand;

"Valve Exercise"—the purpose of this function may be to exercise and monitor valves that remain in one position, such as the closed or open position, for extended periods;

"Valve Packing Torque"—the purpose of this function may be to extract valve packing hysteresis between the open and closed cycle for applications such as BFV applications with sufficient dynamic torques;

"Line Filter and Silencers Conditions"—the purpose of this function may be to identify and signal whether air supply or air exhaust is restricted by measuring and evaluating time constants of charging and discharging of actuator cylinder pressures;

"Solenoid Spool Sticking"—this function may be used to identify and signal whether the solenoid valve is sticking by measuring and evaluating the time from solenoid control signal to pressure response.

Safety integration levels may be used to define the goals and identify unacceptable levels of operational risk. The techniques and methods for identifying and quantifying safety integrity levels, calculating average probability of failure on demand, and failure and test strategies to reduce the overall failure rate are known from the related art. Thus, the electronic components of the valve controller according to the preferred embodiments may combine real time monitoring data with risk assessment models and safety algorithms identified in a logic solver either remotely or through the use of an on-board microprocessor to reduce the average probability of potentially dangerous failures of process valves and ancillary equipment and systems.

Figure 15:
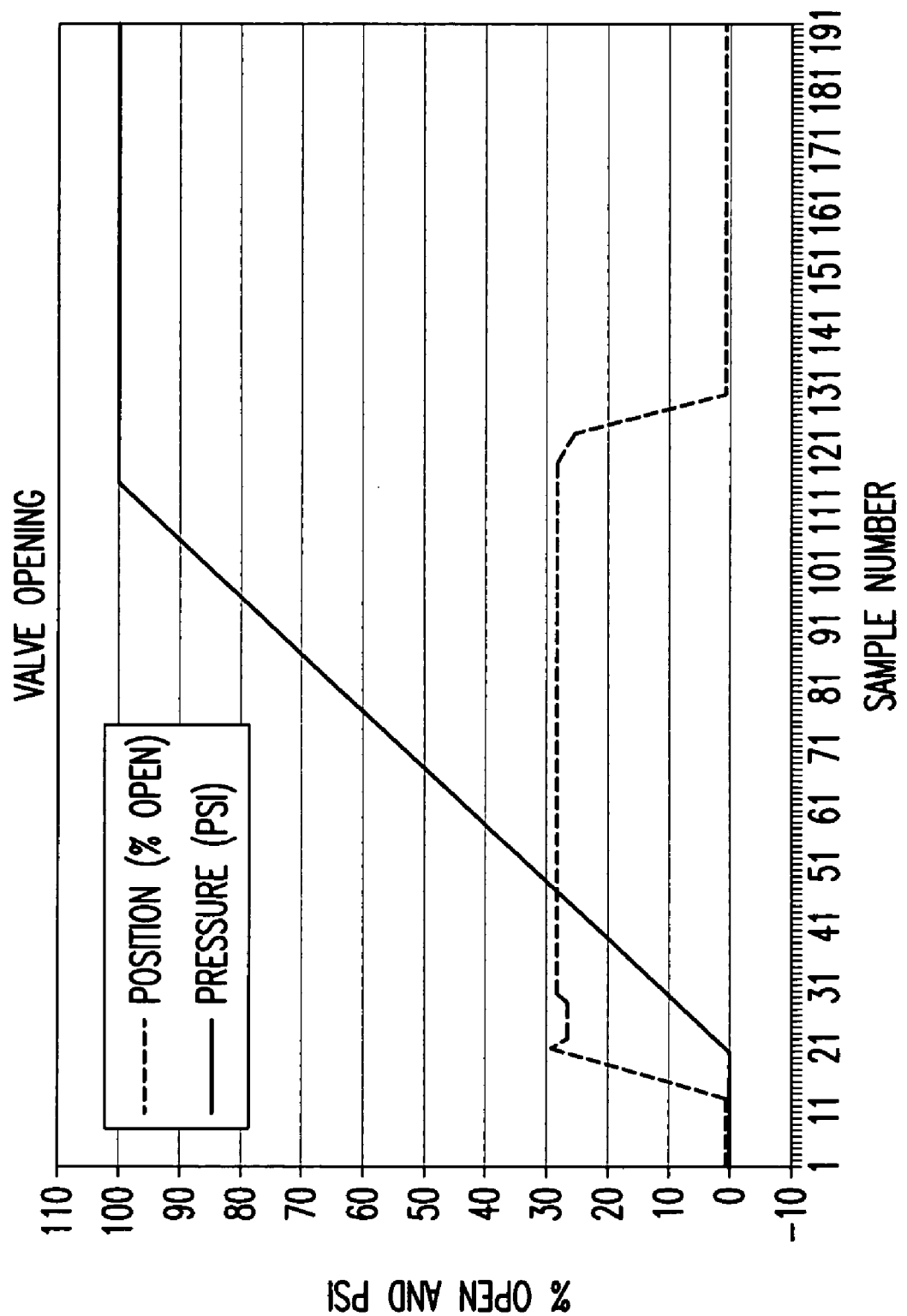
FIG. 15 is a chart showing exemplary data describing the relationship between valve controller air supply pressure and valve position.

To implement such a diagnostic program, a data-sampling rate can be used to develop an accurate representation of all the valve failure trends of interest. For example, FIG. 15 shows a graph with 200 samples representing a valve movement, which may detect many if not all valve failure trends. The hardware and software of the valve controller according to the preferred embodiments may be configured to handle the proper number of samples to further ensure that valve failure trends of interest are captured by the diagnostic program.

In addition, some industrial fieldbus Network Cards may have capability of less than 1K of RAM. Thus, fragment data transfer over the Network Card may have to be employed. A similar technique may further be used to transfer this data over the network, as each network protocol also has a limit to the amount of data that can be sent in one message. For example, lower sampling rates in each Sequence of Samples may be used, the data may be compressed, and/or some of the data may be processed locally on the motherboard. For these reasons, the valve controller according to the preferred embodiments may be configured with hardware and software robust enough to provide for at least these data transfer configurations.

Wireless technology may be used in combination with a valve controller having the specific valve operative arrangements and knowledge based valve performance discussed above. For example, each of the features for protection with respect to the valve operative arrangements and knowledge based valve performance may be individually protected for use with a short-range wireless protocol, and a communication method via the Internet. Combining the knowledge based valve performance methods with remote communications via the Internet may provide various opportunities to protect new methods of maintenance of valves at a location remote from the location of a maintenance staff. For example, a method of maintaining the operative performance of two valves may be performed. The method includes, for example, evaluating the operative conditions of two valves with a single valve controller; communicating the operative conditions of the two valves to a remote location via an Internet communication link; and changing operative commands of the valve controller via an Internet communication link.

Systems that utilize features on the valve controller may be protected. For example, a system of piping including a first pipe, a second pipe proximate the first pipe, a valve disposed between the first pipe and the second pipe, a valve actuator that operates the valve, and a valve controller that operates the valve actuator, the valve controller including a housing having a single supply path that feeds two separate pilot paths, the two separate pilot paths having a common exhaust path may be protected by the valve controller. The operative performance of the system may likewise be protected. Further details of the system may be added to specify the various uses of the valve controller. For example, piping to the controller could be defined and protection of written materials specifying the valve controller and its use may also be protected on a system wide basis.

Based on the foregoing, valve controller 10 may include a manifold assembly 20 including a manifold with two integral coils and spools. The manifold assembly may further include a manifold having a single supply path, two pilot paths, and single exhaust path. The manifold may be a monolithic member or a two-piece member. For example, a two-piece manifold may include a base and a cover. The cover can define paths within the base. Thus, the manifold assembly may use a cover to define pneumatic operative paths of the valve controller. Moreover, the valve controller may have a manifold assembly that uses the same fasteners to secure the cover to the base of a housing. The manifold may also include one or more sensors. The sensors may monitor airflow through the manifold and signal other mechanical or electronic components. The valve controller may have a housing with a single pneumatic supply path, two separate pilot paths, a single exhaust path, and an individual pressure sensor for each path. In one embodiment, two of the sensors may be differential pressure sensors. The valve controller may also have valve position indicator or beacon (position indicator) located between separate chambers for mechanical and electronic components. The size of the beacon (position indicator) being selected to allow for viewing from a remote location. The beacon (position indicator) can operate via a non-contact position sensor. Moreover, the valve controller may provide for different operative arrangements. The valve controller may have a single pneumatic supply port that allows for two operational control signals. The two operational control signals may provide a first command signal and a second command signal to a single valve. The first command signal may be a discrete command signal. The second command signal may be a modulating command signal. The valve controller may be integrated with an actuator, the valve controller having a single pneumatic supply port that allows for two operational control signals. The valve controller may be used to operate a valve with two different command signals from a single pneumatic supply port. The valve controller may be used in a method of operating an integrated actuator with two different command signals from a single pneumatic supply port. The valve controller may have a single pneumatic supply port that allows for two operational control signals. The two operation control signals may provide a discrete command signal to a first valve and a separate discrete command signal to a second valve. The valve controller may be integrated with an actuator, the valve controller having a single pneumatic supply port that allows for two separate and identical operational control signals. The valve controller may be configured to provide a method of controlling fail-safe operation of two valves with a single supply.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An apparatus for controlling a valve, the apparatus comprising:
   an enclosure;
   an operating media distribution system disposed in the enclosure, the operating media distribution system including:
   a manifold block having a plurality of holes;
   an operating media supply passage extending from each of the plurality of holes to an exterior surface of said manifold block;
   an operating media exhaust passage extending from each of the plurality of holes to said exterior surface of said manifold block;
   an operating media distribution cartridge including:
   a cylinder disposed in a respective one of the plurality of holes and being exchangeable with respect to the manifold block, said cylinder having an outer surface extending along an axis associated with said cartridge, said cylinder having a plurality of recesses defined by a plane lying along the cartridge axis, at least one circumferential groove circumscribing the cartridge axis; and at least one longitudinal groove extending parallel to the cartridge axis; and a spool assembly disposed in the cylinder and being displaceable between a first and a second configuration relative to the cylinder; and an electronic control unit disposed in the enclosure, the electronic control unit operates a valve to control operating media flow in the operating media distribution system.

2. The apparatus of claim 1, further comprising at least one sensor disposed in the enclosure, the sensor evaluates the operating media distribution system and provides information to the electronic control unit about at least one condition in at least one of the passages.

3. The apparatus of claim 1, wherein the enclosure comprises first and second chambers wherein the first chamber is spaced along a longitudinal axis from the second chamber.

4. The apparatus of claim 3, further comprising an indicator proximate the first and second chambers, the indicator having a visual symbol that identifies an operational state of at least one valve.

5. The apparatus of claim 4, wherein the indicator is disposed along the longitudinal axis and between the first and second chambers.

6. The apparatus of claim 2, wherein the operating media distribution system comprises a plurality of connection ports, each of the plurality of connection ports provides fluid communication with a respective one of the operating media supply passages, and the operating media exhaust passage.

7. The apparatus of claim 1, wherein said cartridge comprises a first and second cartridge.

8. The apparatus of claim 2, further comprising:
a plurality of connection ports disposed at the exterior surface of the manifold block, each of the plurality of connection ports provides fluid communication with a respective one of the operating media supply passages, and the operating media exhaust passage.

9. The apparatus of claim 1 wherein said cylinder further comprises an inner and outer surface and a plurality of apertures penetrating the cylinder and extending between the inner and outer surfaces.

10. The apparatus of claim 1 wherein said enclosure disposed entirely between first and second parallel planes, the first and second parallel planes being spaced apart a first distance less than or equal to three inches, and the enclosure extending longitudinally a second distance and extending transversely a third distance that is approximately one-half of the second distance.

11. The apparatus of claim 10 further comprising an indicator disposed about an axis extending between the first and second planes, the indicator including a visual symbol that identifies an operational state of the at least one process valve, the visual symbol being visible from above the first plane and from below the second plane, and the axis being disposed at an intersection defined approximately midway along the second distance and midway along the third distance, the indicator projects radially from the axis a fourth distance that is approximately one-third of the second distance and approximately two thirds of the third distance.

12. The apparatus of claim 10, wherein the distance between the first and second parallel planes is less than 2.5 inches.

13. The apparatus of claim 10, wherein the second distance is approximately 8.5 inches, and the third distance is approximately 4.2 inches.

14. The apparatus of claim 10, wherein the enclosure comprises first and second chambers, and the first chamber is spaced along a longitudinal axis from the second chamber.

15. The apparatus of claim 1, wherein the plurality of holes comprises two holes, the operating media supply passage as defined by the manifold block comprises a main supply passage and two branch supply passages, and the operating media exhaust passage as defined by the manifold block comprises a main exhaust passage and four branch exhaust passages.

16. The apparatus of claim 15, wherein the two holes consist of first and second holes, the two branch supply passages consist of first and second branch supply passages, and the four branch exhaust passages consist of first, second, third and fourth branch exhaust passages.

17. The apparatus of claim 16, wherein the first branch supply passage communicates operating media from the main supply passage to the first hole, the second branch supply passage communicates operating media from the main supply passage to the second hole, the first and second branch exhaust passages communicate operating media from the first hole to the main exhaust passage, and the third and fourth branch exhaust passages communicate operating media from the second hole to the main exhaust passage.

18. The apparatus of claim 1, wherein the spool assembly is displaceable between said first and second configurations along a respective cartridge axis with respect to the cylinder.

19. The apparatus of claim 1, wherein the cylinder concentrically circumscribes the spool assembly.

20. The apparatus of claim 1, wherein said valve is an electromagnetic valve and said spool assembly is exchangeable with respect to the cylinder.

21. The apparatus of claim 9, wherein respective ones of the plurality of apertures respectively penetrate each of the plurality of recesses.

22. The apparatus of claim 21, wherein the plurality of recesses comprise a supply recess disposed along the cartridge axis between a first and second exhaust recesses, the supply recess is in fluid communication with the operating media supply passage, and the first and second exhaust recesses are in fluid communication with the operating media exhaust passage.

23. The apparatus of claim 1, wherein the plurality of recesses comprise first and second sets of recesses, the first set of recesses being defined by the first plane with respect to the cartridge axis, the second set of recesses being defined by a second plane lying with respect to the cartridge axis, and the first and second planes being parallel and on diametrically opposite sides of the cartridge axis.

24. The apparatus of claim 1, wherein the at least one circumferential groove comprises first, second and third circumferential grooves, the second circumferential groove is disposed along the cartridge axis between the first and third circumferential grooves, and the second circumferential groove is in fluid communication with at least one of the plurality of recesses.

25. The apparatus of claim 24, wherein the second circumferential groove is in fluid communication with the operating media supply passage, and the valve controls operating media flow (a) from the operating media supply passage to the first and third circumferential grooves, and (b) from the first and third circumferential grooves to the operating media exhaust passage.

26. The apparatus of claim 1, wherein the at least one longitudinal groove comprises a plurality of longitudinal grooves extending from the at least one circumferential groove.

27. The apparatus of claim 1, wherein said valve is an electromagnetic valve and the at least one longitudinal groove provides fluid communication between the operating media supply passage and the electromagnetic valve.

28. The apparatus of claim 1, wherein the spool assembly comprises:
a spool extending along a spool axis; the spool including alternating large and small diameter bands circumscribing the spool axis;
an annular sleeve circumscribing the spool, the sleeve including a plurality of sets of radial perforations and a plurality of sleeve O-rings, each set of radial perforations and each one of the plurality of sleeve O-rings being alternatingly disposed along an axis of said cartridge; and
a plurality of spacers circumscribing the annular sleeve, each of the plurality of spacers including a spacer O-ring adapted to sealingly engage the inner surface of the cylinder.

29. The apparatus of claim 1, wherein said operating media distribution cartridge comprises a resilient element biasing the spool assembly with respect to the cylinder.

30. The apparatus of claim 29, wherein the resilient element comprises a compression spring.

31. The apparatus of claim 1, wherein said operating media distribution cartridge comprises a cylinder cap engaging the cylinder and confining the spool assembly displaceably between the first and second configurations within the cylinder.

32. The apparatus of claim 1, wherein the enclosure comprises at least one cover that provides access to the operating media distribution system.

33. The apparatus of claim 4, wherein the enclosure is disposed entirely between first and second parallel planes, the first and second parallel planes being spaced apart a first distance less than or equal to three inches.

34. The apparatus of claim 33, wherein said visual symbol is visible from above the first plane and is visible from below the second plane.

35. The apparatus of claim 33, wherein the enclosure extends longitudinally a second distance and extends transversely a third distance that is approximately one-half of the second distance.

36. The apparatus of claim 35, wherein the indicator is disposed about an axis extending between the first and second planes, the axis is disposed at an intersection defined approximately midway along the second distance and midway along the third distance, and the indicator projects radially from the axis a fourth distance that is approximately one-third of the second distance and approximately two thirds of the third distance.

37. The apparatus of claim 4, wherein the indicator comprises:
a first member defining an interior space; and a second member disposed within the interior space, the second member including the visual symbol that identifies the operational state of the at least one valve.

38. The apparatus of claim 37, wherein the second member oscillates with respect to the first member.

39. The apparatus of clam 37, wherein the first member is at least partially transparent.

40. The system of claim 37, wherein the second member oscillates with respect to the first member.

41. The apparatus of claim 2, wherein the at least one sensor comprises a plurality of sensors that each provide information about at least one condition in a respective one of the passages.

42. The apparatus of claim 41, wherein the each of the plurality of sensors provides information about operating media pressure.

43. The apparatus of claim 41, wherein at least one of the plurality of sensors comprises a differential pressure sensor.

44. The apparatus of claim 4, wherein the indicator comprises a position sensor that evaluates valve position and provides valve position data to the electronic control unit.

45. The apparatus of claim 44, wherein the electronic control unit monitors valve performance and develops at least one diagnostic profile.

46. The apparatus of claim 45, wherein the at least one diagnostic profile is selected from the group consisting of Insufficient Line Pressure to Guarantee Correct Operation, Supply Pressure Failure, and Valve Shaft Bent.

47. The apparatus of claim 45, wherein the at least one diagnostic profile is selected from the group consisting of Valve Not Achieving Full Stroke, Backlash Detection and Torque Demand of Valve Approaching Actuator Limit.

48. The apparatus of claim 45, wherein the at least one diagnostic profile is selected from the group consisting of Valve Seating/Break-out Torque Monitoring, Torque Limit Exceeded, and Close-on Torque.

49. The apparatus of claim 45, wherein the at least one diagnostic profile is selected from the group consisting of Shaft Broken, Valve Exercise, Valve Packing Torque, Line Filter and Silencer Conditions, and Solenoid Spool Sticking.

50. The apparatus of claim 1 wherein the operating media distribution system distributes an operating media comprising air.

51. The apparatus of claim 50, wherein the operating media in the operating media supply passage comprises the air having a pressure of about 40 to 120 pounds per square inch.

52. The apparatus of claim 50, wherein the operating media in the operating media supply passage comprises the air having a pressure of about 15 to 45 pounds per square inch.

53. The apparatus of claim 50, wherein the operating media in the operating media supply passage comprises the air having a pressure of less than about 120 pounds per square inch.

54. The apparatus of claim 53, wherein the pressure of the air in the operating media supply passage is less than about 40 pounds per square inch.

55. The apparatus of claim 50, wherein the operating media in the operating media supply passage comprises the air having a temperature of about −40 to 180 degrees Fahrenheit.

56. The apparatus of claim 50, wherein the operating media in the operating media supply passage comprises the air having a flow rate of about 5 standard cubic feet per minute at about 40 pounds per square inch to about 100 standard cubic feet per minute at about 120 pounds per square inch.

57. An apparatus for controlling a valve, the apparatus comprising:
an enclosure;
an operating media distribution system disposed in the enclosure, the operating media distribution system including:
a manifold block having a plurality of holes;
an operating media distribution cartridge including:
a cylinder disposed in a respective one of the plurality of holes and being exchangeable with respect to the manifold block, said cylinder having an outer surface extending along an axis associated with said cartridge and having a plurality of recesses defined by a plane lying along the cartridge axis; and a spool assembly disposed in the cylinder and being displaceable between a first and a second configuration relative to the cylinder; and an electronic control unit disposed in the enclosure, the electronic control unit operates a valve to control operating media flow in the operating media distribution system.

* * * * *